United States Patent
Vincent

(10) Patent No.: US 9,298,723 B1
(45) Date of Patent: Mar. 29, 2016

(54) DEDUPLICATION ARCHITECTURE

(71) Applicant: Pradeep Vincent, Kenmore, WA (US)

(72) Inventor: Pradeep Vincent, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 654 days.

(21) Appl. No.: 13/623,049

(22) Filed: Sep. 19, 2012

(51) Int. Cl.
*G06F 7/00* (2006.01)
*G06F 17/30* (2006.01)
*G06F 3/06* (2006.01)

(52) U.S. Cl.
CPC ........ *G06F 17/30156* (2013.01); *G06F 3/0641* (2013.01)

(58) Field of Classification Search
CPC .......................... G06F 17/30156; G06F 3/0641
See application file for complete search history.

(56) References Cited

U.S. PATENT DOCUMENTS

| | | | |
|---|---|---|---|
| 7,200,604 B2 | 4/2007 | Forman et al. | |
| 7,539,745 B1 | 5/2009 | Wang et al. | |
| 7,567,188 B1 | 7/2009 | Anglin et al. | |
| 7,761,425 B1 | 7/2010 | Erickson et al. | |
| 7,814,074 B2 | 10/2010 | Anglin et al. | |
| 8,392,384 B1 * | 3/2013 | Wu et al. | 707/693 |
| 2002/0069369 A1 | 6/2002 | Tremain | |
| 2006/0064508 A1 * | 3/2006 | Panwar et al. | 709/250 |
| 2006/0123010 A1 | 6/2006 | Landry et al. | |
| 2008/0005201 A1 | 1/2008 | Ting et al. | |
| 2009/0144422 A1 | 6/2009 | Chatley et al. | |
| 2010/0070725 A1 | 3/2010 | Prahlad et al. | |
| 2010/0094817 A1 | 4/2010 | Ben-Shaul et al. | |
| 2010/0138827 A1 | 6/2010 | Frank et al. | |
| 2010/0174939 A1 * | 7/2010 | Vexler | 714/5 |
| 2010/0250858 A1 * | 9/2010 | Cremelie et al. | 711/136 |
| 2010/0250896 A1 | 9/2010 | Matze | |
| 2010/0312752 A1 * | 12/2010 | Zeis et al. | 707/640 |
| 2010/0318759 A1 * | 12/2010 | Hamilton et al. | 711/171 |
| 2011/0161723 A1 | 6/2011 | Taleck et al. | |
| 2011/0218969 A1 | 9/2011 | Anglin et al. | |

(Continued)

FOREIGN PATENT DOCUMENTS

| | | |
|---|---|---|
| JP | 20002268935 | 9/2000 |
| JP | 2010250760 | 11/2010 |

OTHER PUBLICATIONS

U.S. Appl. No. 14/136,624, filed Dec. 20, 2013, Marvin Michael Theimer.

(Continued)

*Primary Examiner* — Charles Lu
(74) *Attorney, Agent, or Firm* — Robert C. Kowert; Meyertons, Hood, Kivlin, Kowert & Goetzel, P.C.

(57) ABSTRACT

A receiver-side deduplication architecture for data storage systems, for example remote data storage systems that use block-based data storage and that provide the data storage to client(s) via a network. The architecture may provide network deduplication by reducing bandwidth usage on communications channel(s) between the client(s) and the data storage systems. The architecture may leverage block storage technology of a data store provided to clients by a data store provider and caching technology to implement a deduplication data dictionary. The deduplication data dictionary includes deduplication data blocks stored in the data store and a mapping tier that leverages caching technology to store and maintain a store of key/value pairs that map data block fingerprints to deduplication data blocks in the data store.

29 Claims, 15 Drawing Sheets

(56) References Cited

U.S. PATENT DOCUMENTS

2011/0246741 A1    10/2011    Raymond et al.
2012/0158672 A1*    6/2012    Oltean et al. ................ 707/692

OTHER PUBLICATIONS

Greer, D. Reducing the Storage Burden via Data Deduplication. Computer, Dec. 2008, vol. 41 Issue:12, pp. 15-17.

Austin T. Clements, Irian Ahmad, Murali Vilayannur, Jinyuan Li. Decentralized Deduplication in SAN Cluster File Systems. Proceedings of the 2009 conference on USENIX Annual technical conference, pp. 1-20.

U.S. Appl. No. 12/981,397, filed Dec. 29, 2010, James Christopher Sorenson III.

U.S. Appl. No. 12/981,393, filed Dec. 29, 2010, James Christopher Sorenson III.

U.S. Appl. No. 14/605,843, filed Jan. 26, 2015, James Christopher Sorenson III.

* cited by examiner

DEDUPLICATION ARCHITECTURE

BACKGROUND

In many data systems, broadly viewed, a sender (a data source) uploads data to a receiver (a data processor) via a communications channel. An example of such a system is a data storage system; however, these data systems may include any system in which a receiver somehow processes data uploaded from a sender. The uploaded and processed data may include, but is not limited to, any type of textual, graphical, or image data, audio data (e.g., music and voice data), video data, compressed and/or encrypted data, and so on. In many such systems, large amounts of data may need to be uploaded from the sender to the receiver via the communications channel. However, communications channels generally have bandwidth constraints, while a goal of such data systems is to get as much usable data across the communications channel to the receiver as possible.

Data deduplication refers to techniques for reducing or eliminating redundant data in such systems, for example to improve storage utilization in a data storage system (referred to as data deduplication) and/or to reduce bandwidth usage on the communications channel (referred to as network data deduplication, or simply network deduplication). As an example, in at least some data deduplication techniques applied to data storage systems, the storage of duplicate data to a data store may be prevented. To achieve this, units of data that already reside in the data store, and/or units of data that do not reside in the data store, may be identified, and only the units that do not reside in the data store are stored or updated in the data store. Data deduplication in this application may thus reduce required storage capacity since fewer or only one copy of a particular unit of data is retained.

Figure 1:
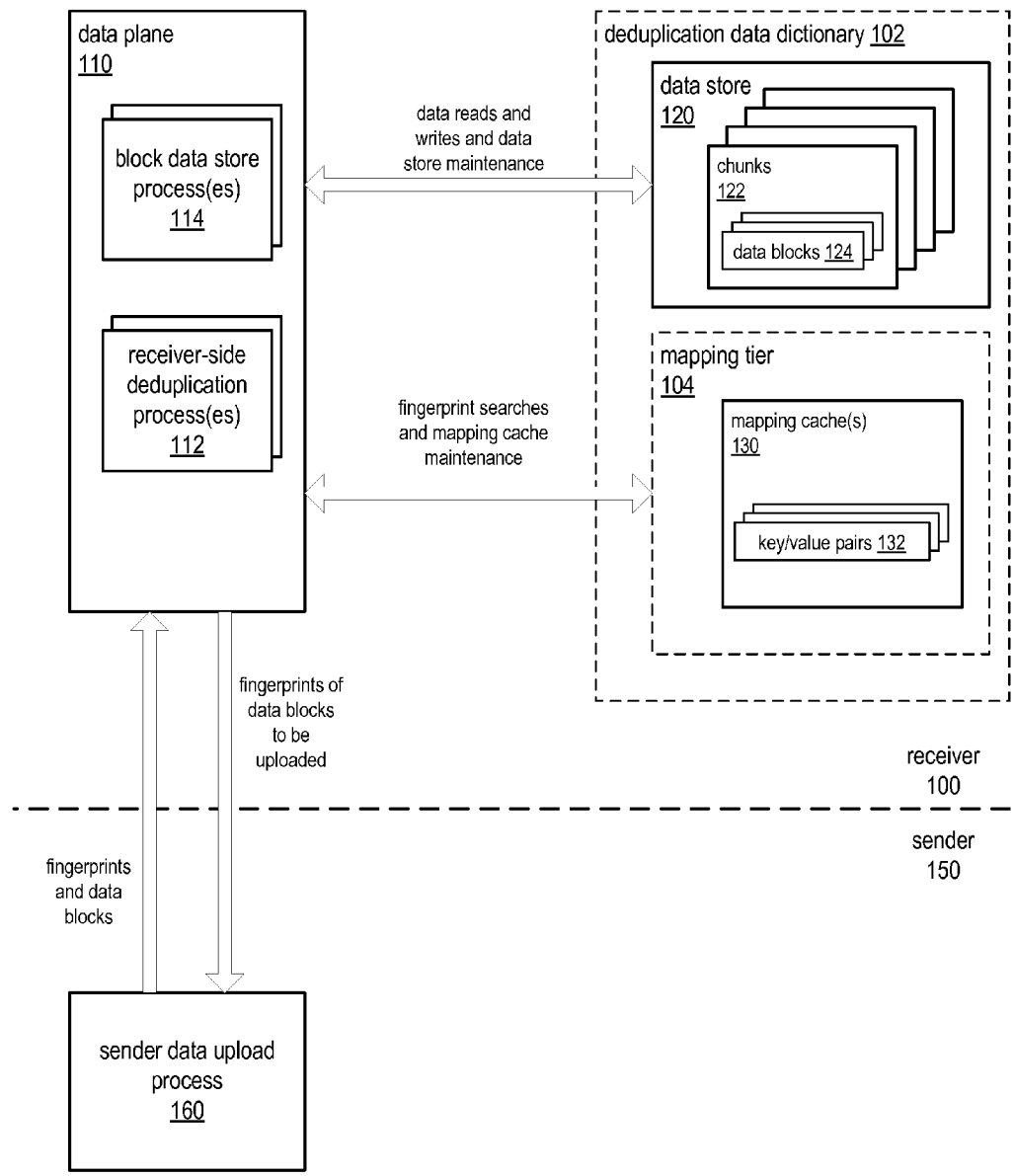
FIG. 1 is a high-level block diagram of a receiver-side deduplication architecture, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for receiver-side deduplication are described. Embodiments of a receiver-side deduplication architecture and deduplication techniques are described that may be applied in data storage systems to provide network deduplication by reducing bandwidth usage on the communications channel(s) between data sender(s) and the receiver (the data store provider). While primarily directed to network deduplication rather than data deduplication, some embodiments may also improve storage utilization in the data storage system by reducing the amount of data that is actually stored. For example, embodiments may be applied in remote data storage systems that use block-based data storage and that provide the data storage to client(s) as primary or backend storage.

In receiver-side deduplication, rather than the sender maintaining a fingerprint dictionary and determining data units to be uploaded to the receiver, the receiver maintains the fingerprint dictionary. When a sender has data to be uploaded, the sender extracts fingerprints (e.g., hashes) for the data and sends only the fingerprints to the receiver. The receiver checks its fingerprint dictionary to determine the data units to be uploaded to the receiver and notifies the sender, which then sends only the identified units of data to the receiver. Receiver-side deduplication thus reduces the bandwidth used in uploading data from the sender to the receiver as only the units that are not present in the data store according to the fingerprint dictionary are uploaded. Receiver-side deduplication removes or reduces the requirement for the sender to maintain a large fingerprint dictionary and centralizes deduplication at the receiver, thus allowing deduplication to be applied across data stored for multiple data sources.

However, conventional receiver-side deduplication architectures typically employ dedicated temporary storage, separate from the primary data store in which clients' data is stored, to maintain a backing store for deduplication data.

In embodiments of the receiver-side deduplication architecture and technique describe herein, instead of using separate, dedicated storage to maintain a backing store for deduplication data, the block storage technology of the data store provided by the data store provider and standard or commodity caching technology (e.g., Memcached technology) may be leveraged to implement a deduplication data dictionary.

The following describes embodiments of the receiver-side deduplication architecture as well as receiver-side data deduplication techniques including techniques that may be used to manage the components of the deduplication data dictionary. Embodiments of the receiver-side deduplication architecture and techniques may, for example, be implemented in the context of a service provider that provides remote data storage to clients via a network. For example, the service provider may provide access to the deduplication techniques to its clients that store data to the remote data storage via a deduplication Web service and Web service interface. An example implementation of the receiver-side deduplication architecture and techniques in the context of a service provider that provides remote data storage to clients via a storage service and a gateway appliance is described.

While embodiments of the receiver-side deduplication architecture and technique are generally described herein in reference to data storage system applications, the architecture and technique may be applied in any system in which a receiver receives data uploaded from a sender. The uploaded and processed data may include, but is not limited to, any type of textual, graphical, or image data, audio data (e.g., music or voice data), video data, compressed and/or encrypted data, and so on. In addition, while embodiments are generally described herein in terms of a sender and a receiver that are remotely located and communicate via a wired and/or wireless network such as the Internet, the data deduplication technique may also be applied in applications where the sender and receiver are local devices that communicate, for example, via a wired or wireless local network or direct link, as well as applications where the sender and receiver are hardware and/or software components within a single device or system that communicate via an internal communications channel such as a data bus, direct data link, shared memory transfer, or wireless communications channel.

Figure 7:
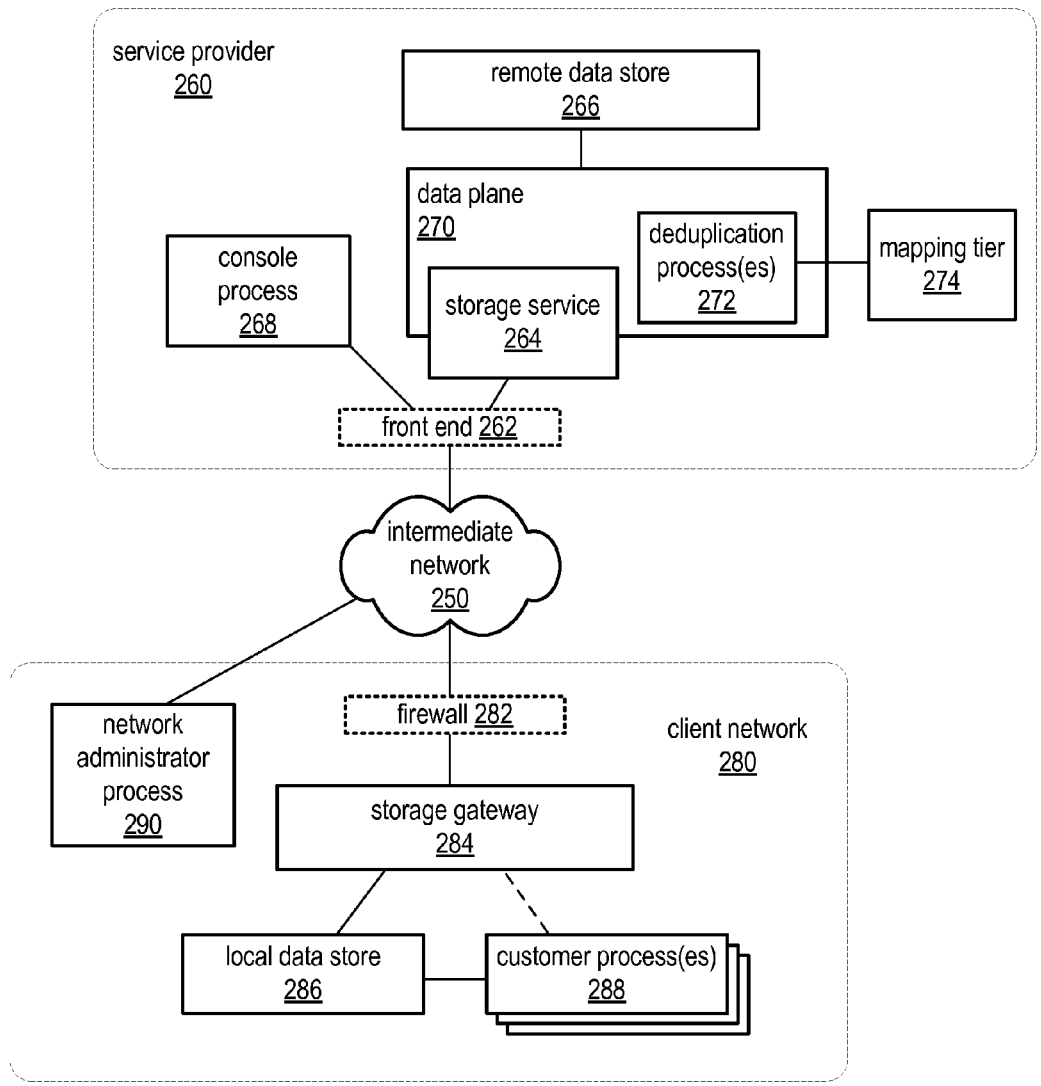
FIG. 7 is a high-level block diagram of an example networking environment that includes an example service provider and an example client or service customer in which embodiments of the receiver-side deduplication architecture and techniques may be implemented.

FIG. 1 is a high-level block diagram of a receiver-side deduplication architecture that may implement the deduplication techniques described herein, according to at least some embodiments. The deduplication architecture may, for example, be implemented in the context of a data store provider (receiver 100) that provides access via a network (e.g., the Internet) to a block-based data store 120, fronted by a data plane 110, to one or more clients (e.g., sender 150). FIG. 1 shows a single sender 150; however, there may be more than one sender 150. Sender 150 may, for example, correspond to a single system such as a server, a collection of systems such as a server cluster, or a data center, but in general sender 150 may correspond to any device or system that may upload data to receiver 100. In some implementations, sender data upload process 160 may be a process of or executing on a storage gateway 284 as shown in FIG. 7.

Data plane 110 may comprise one or more network devices (e.g., servers or host systems) that implement data store process(es) 114 that may provide an interface between the client(s) (e.g., via sender data upload process(es) 160 on the sender 150 side) and the data store 120, and that may provide management logic (e.g., volume-based storage, data I/O, garbage collection, backup, mirroring, etc.) for the data store 120. One or more receiver-side deduplication processes 112 of the deduplication architecture and technique may be implemented on the data plane 110. Note that data store processes 114 and receiver-side deduplication processes 112 may be implemented on the same servers or host systems, or on different servers or host systems. In at least some embodiments, receiver 100 may provide one or more interfaces, for example Web services interfaces or APIs, via which a sender 150 may access functionality provided by the data plane 110, including but not limited to the receiver-side deduplication functionality described herein.

Rather than using separate, dedicated storage to maintain a backing store for deduplication data units in the deduplication data dictionary, embodiments of the deduplication architecture and technique may leverage block storage technology of the data store 120 provided by the data store provider and caching technology to implement a deduplication data dictionary 102. The deduplication data dictionary 102 includes the data store 120 that stores data units (data blocks 124) stored in chunks 122 and a mapping tier 104 that leverages the caching technology to store and maintain key/value pairs 132 that map data block fingerprints (e.g., hashes) to deduplication data units (data blocks 124) in the data store 120. A chunk may be defined as a collection of data blocks. Each data block 124 thus represents a fraction of a chunk 122 in the data store 120. As a non-limiting example, chunk size may be 4 megabytes (mB) and data block size may be 4 kilobytes (kB). In this example, there are 1 k (1000) data blocks 124 per chunk 122. However, other chunk sizes and/or data block sizes may be used. The fingerprints (e.g., hashes) may uniquely identify the data units in the data storage system. In at least some embodiments, a fingerprint may be any type of cryptographically strong one-way hash function, for example a Secure Hash Algorithm (SHA)-256 hash function. The use of a cryptographically strong one-way hash function may provide security, and may help to avoid collisions, as collisions using such a hash function are highly unlikely. A collision is when two units of data produce the same fingerprint. However, in some embodiments, fingerprints may be generated according to any hashing technique, or other techniques than hashing may be used to generate fingerprints.

As noted, the data units stored in the data store 120 (e.g., chunks 122) are used as the backing data store for the deduplication functionality. Advantages to using the chunks 122 in the data store 120 directly as the deduplication data store over using a separate, dedicated storage may include, but are not limited to:

Cost per unit data in the deduplication dictionary 102 may be reduced when compared to conventional deduplication systems.

Management logic for the deduplication data store may be significantly simplified. In particular, there may be no need for an eviction mechanism and free space management logic for the deduplication data store; existing management logic for the data store 120 may handle these and other data management functionalities for the data stored in data store 120.

Scalability, reliability, security, and other concerns may be inherently provided by the data store 120 management logic and thus do not have to be separately managed for the deduplication data store.

Note that the data store 120 is not the deduplication data store; instead, the data units (chunks 122) of the data store 120 are leveraged to implement the deduplication data store. In other words, the deduplication data store is maintained within the data store 120 by using locations in the chunks 122 as storage locations for deduplication data blocks 124. Note that data that is not in the deduplication data store may also be stored in the chunks 122 in data store 120.

In at least some embodiments, the chunks 122 in data store 120 may be immutable. That is, the chunks 122 are guaranteed to be valid if they are present in data store 120. To achieve immutability, when a portion (e.g., a data block 124) or all of a given chunk 122 is changed by a client, a new chunk 122 is created and stored to the data store 120 by the data plane 110, rather than overwriting or updating the original chunk 122. A garbage collection process may periodically or aperiodically detect and delete (or invalidate) stale chunks 122 from the data store 120.

In at least some embodiments, the mapping tier 104 may be implemented according to high-performance caching technology, and may be used to maintain a mapping between fingerprints (e.g., hashes) of data blocks 124 that are part of the data dictionary and the locations in the data store 120 at which the data blocks 124 are stored. For example, the location of a data dictionary data block 124 in data store 120 may be indicated by a chunk identifier that identifies the chunk 122 in which the respective deduplication data block 124 is stored, an offset into the chunk 122 at which the respective deduplication data block 124 is stored, and a size. Note that other information for and/or methods of identifying the location of a deduplication data block 124 may be used in some embodiments. For example, in some implementations of a data store, chunks may be versioned, and a chunk version identifier may be included in the information for each data block 124. The fingerprints (e.g., hashes) and location information (also referred to herein as indexes) may be stored as key/value pairs 132 in mapping cache(s) 130. In at least some embodiments, cache(s) 130 may be implemented according to high-speed caching technology, for example an in-memory cache.

In at least some embodiments, a cache service provided by a service provider may be leveraged to implement the mapping tier 104 of the deduplication data dictionary 102. A service provider that provides "cloud" storage to clients via the data store 120 and a storage service may also provide a cache service for deploying, operating, and scaling, an in-memory cache in the cloud. The cache service may improve the performance of web applications by allowing the client to retrieve information from a fast, managed, in-memory caching system, instead of relying entirely on slower disk-based databases. For example, a cache service may be provided that is protocol-compliant with Memcached caching technology. Memcached is an open source, high-performance, distributed memory object caching system. Note, however, that the cache service may be implemented according to other caching technologies. Advantages of using the cache service provided by the service provider to implement the mapping tier 104 may include, but are not limited to:

- The cache service may provide a fast, managed, in-memory caching system that can be leveraged to implement the mapping cache(s) 130.
- The cache service's cache management algorithm and cache management interface can be leveraged.
- The cache service provides mechanisms to scale up and scale down the mapping tier fleet.

However, some embodiments of the deduplication architecture may use other caching technologies to implement the mapping tier 104. For example, a mapping tier 104 using other high-performance caching technology may be implemented, for example if such a cache service is not provided, or if custom cache eviction logic or other custom cache management logic that may not be provided by a cache service is necessary or desired.

Figure 2:
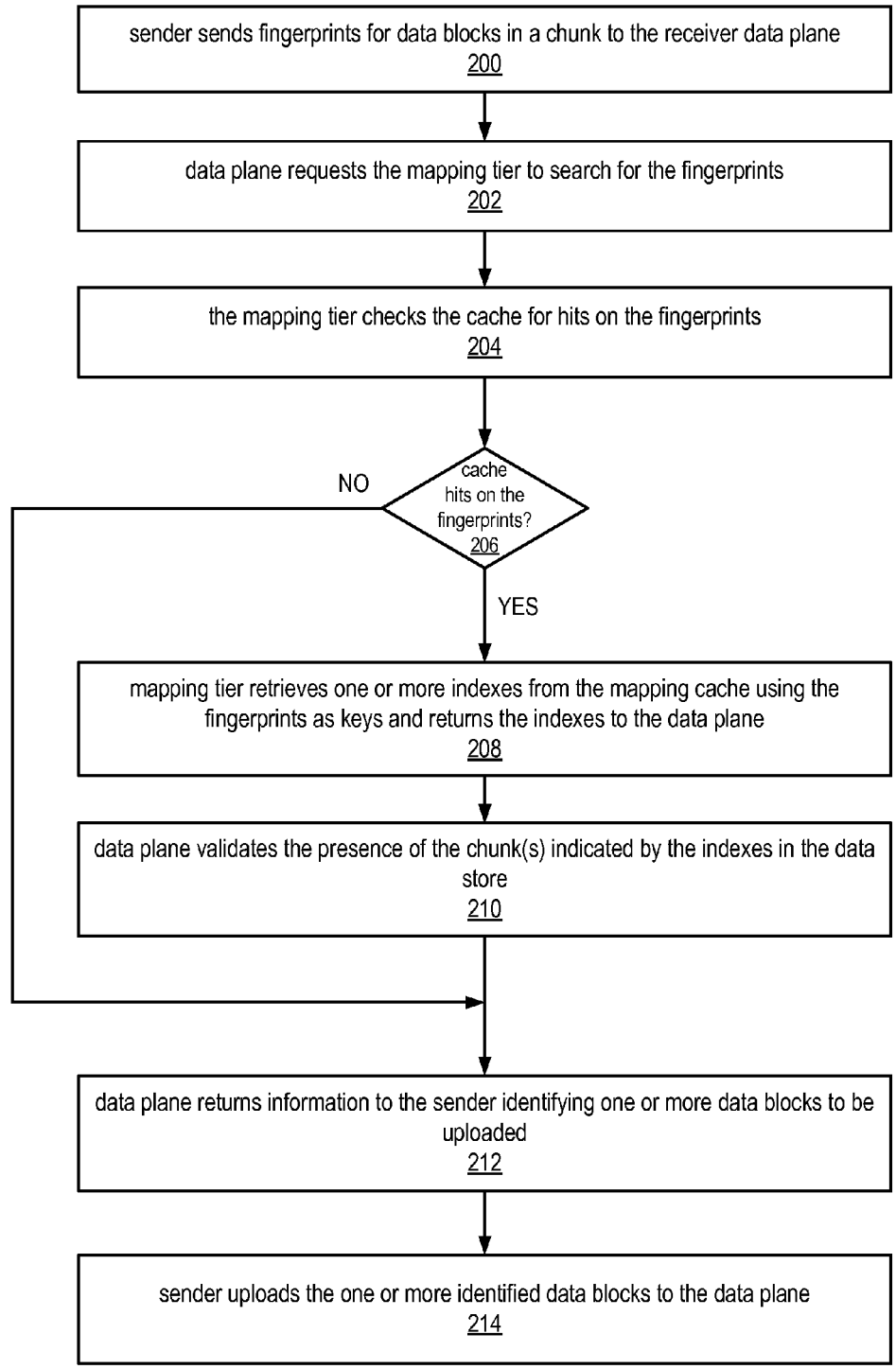
FIG. 2 is a flowchart of a technique for using the mapping cache to check for deduplication data blocks, according to at least some embodiments.
Figure 3:
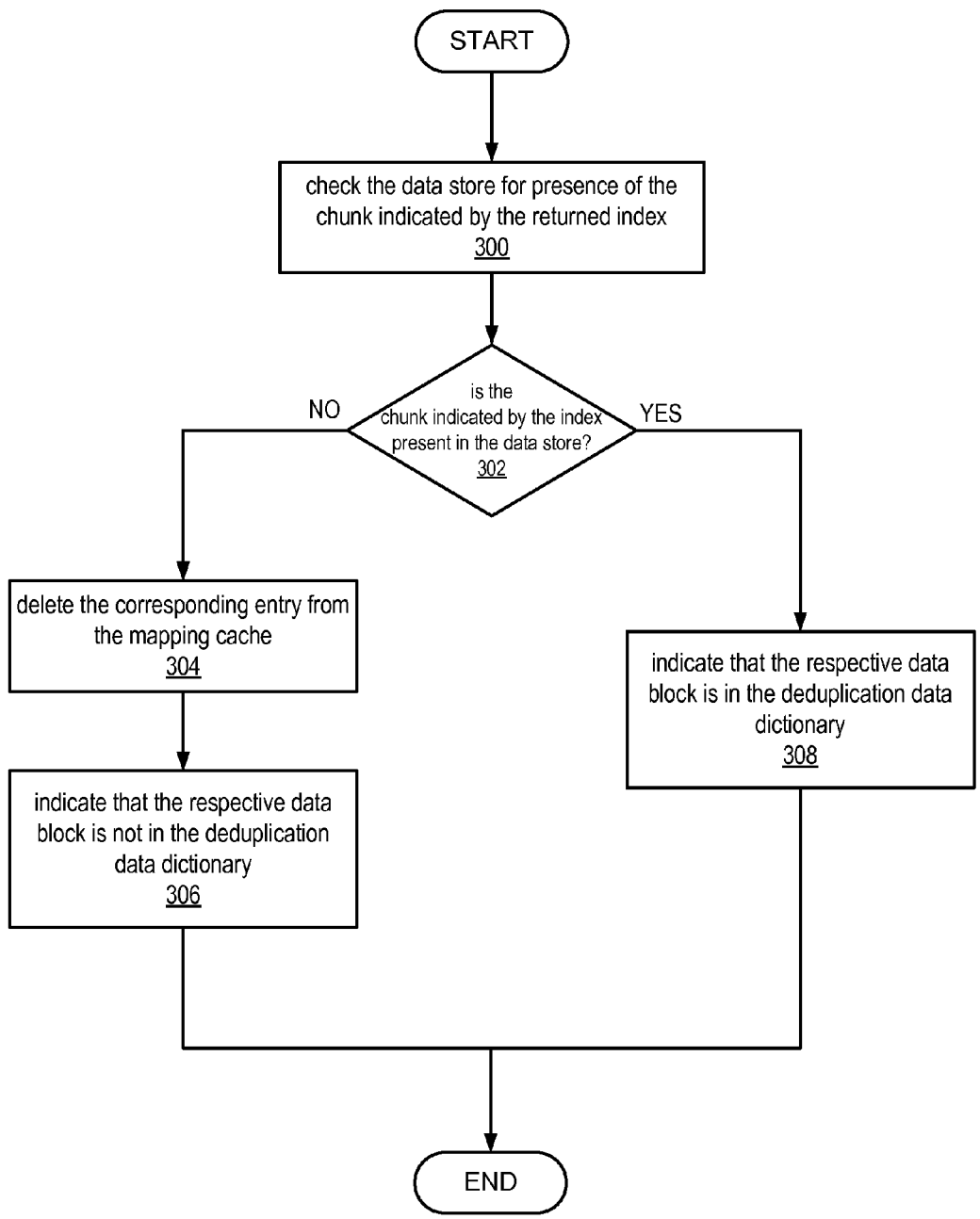
FIG. 3 is a flowchart of a technique for validating the presence of data blocks indicated by mapping cache hits in the deduplication data dictionary, according to at least some embodiments.
Figure 4:
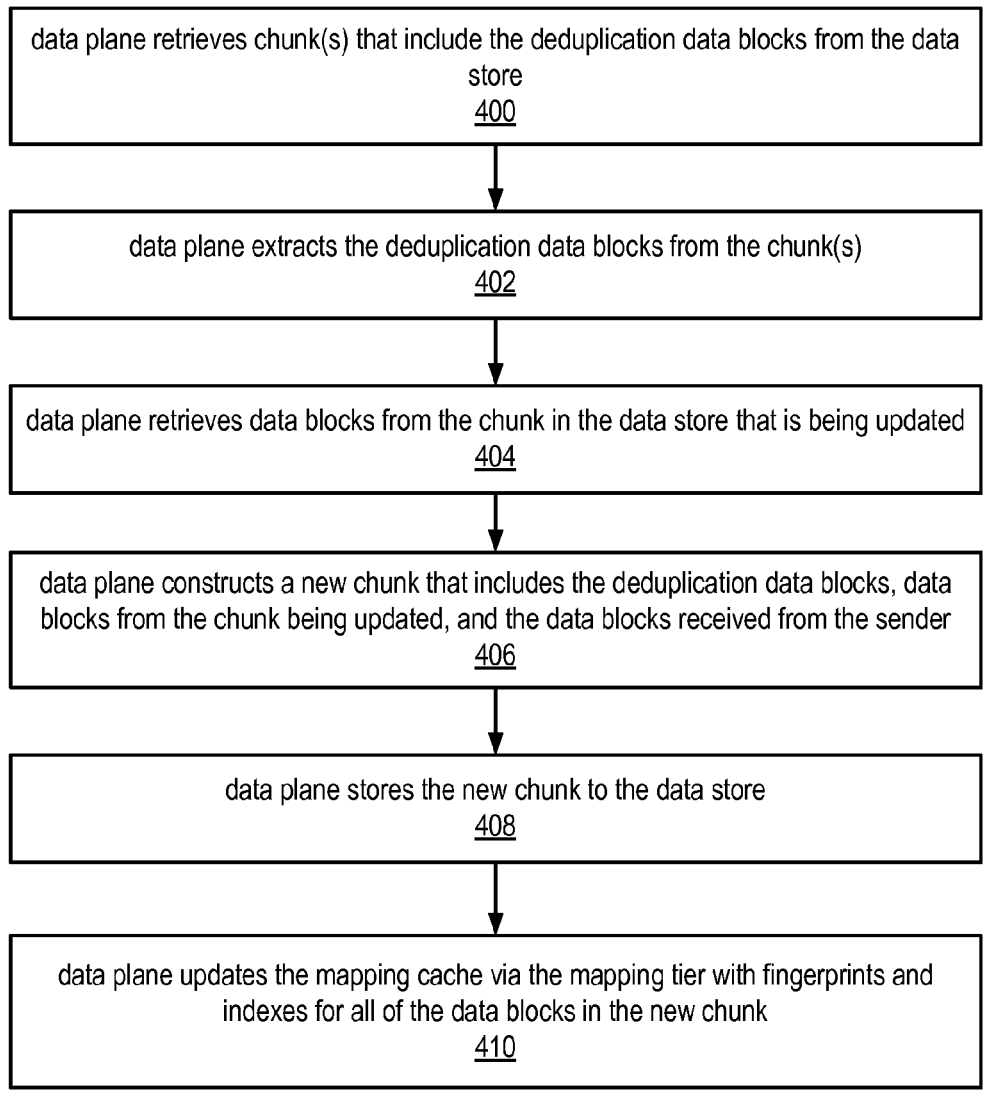
FIG. 4 is a flowchart of a technique for constructing and uploading new chunks to the data store, according to at least some embodiments.

FIGS. 2 through 4 are flowcharts of an embodiment of a deduplication technique implemented according to the receiver-side deduplication architecture, for example as illustrated in FIG. 1.

FIG. 2 is a flowchart of a technique for using the mapping cache to check for deduplication data blocks, according to at least some embodiments. As indicated at 200, a sender 150 (e.g., a client of a service provider that provides data store 120) sends fingerprints for data blocks in a chunk to the receiver 100 (e.g., the service provider) data plane 110. For example, the sender 150 may need to upload a chunk of data to a primary data store or backing data store implemented on data store 120, or may need to update a chunk of data already stored in data store 120. To take advantage of the deduplication technique, a sender data upload process 160 may generate fingerprints (e.g., hashes) for at least one data block of the chunk that may need to be uploaded and send the fingerprint(s) to a receiver-side deduplication process 112 running on a host system on data plane 110. In some implementations, sender data upload process 160 may be a process of or executing on a storage gateway 284 as shown in FIG. 7.

As indicated at 202, after receiving the fingerprints, the data plane 110 may request the mapping tier 104 to search for the fingerprints. For example, the receiver-side deduplication process 112 may query a cache manager process of mapping tier 104 with the fingerprints, requesting a cache search and return of any cache "hits" in the cache 130.

As indicated at 204, the mapping tier 104 checks the mapping cache 130 using the fingerprints as keys. The check of the mapping cache 130 may result in no cache hits, or may result in one or more cache hits. In some embodiments, the mapping tier 104 may update an entry in a data structure for each cache entry for which there is a hit. This information may be used by a cache maintenance process to evict stale cache entries. In at least some embodiments, stale cache entries include cache entries that have not been accessed for a specified period and/or cache entries for which there has not been at least a threshold amount of activity for a specified period. The section Mapping cache implementations and optimizations describes implementations of the mapping tier 104 and mapping cache 130 in more detail, including methods for cache eviction. At 206, if there are no cache hits on the fingerprints, then the mapping tier 104 may return an indication of no cache hits to the data plane 110. In this case, there is no deduplication data in the deduplication data dictionary for the fingerprints sent from the sender data upload process 160 to the data plane 110, and the method may go to element 210.

At 206, if there are cache hits on at least some of the fingerprints, then as indicated at 208, for each cache hit, the mapping tier 104 retrieves the corresponding index from the mapping cache 130. The mapping tier 104 then returns the located index(es) to the data plane 110. In at least some embodiments, the mapping tier 104 may also return an indication of fingerprint(s) for which there was not a hit in the cache 130.

As indicated at 210, the data plane 110 validates the presence of the chunk(s) 122 indicated by the indexes returned from the mapping tier 104 in the data store 120. As previously mentioned, in some implementations of data store 120, the chunks 122 may be immutable (guaranteed to be valid if they are present in data store 120). However, stale chunks 122 may have been garbage collected. Thus, the cache hits as indicated by the index(es) returned from the mapping cache 104 need to be validated against the data store 120 to determine if the chunks storing the deduplication data blocks indicated by the index(es) are still present in the data store 120. If a respective chunk is not present, then the data block(s) that were in that chunk are no longer in the deduplication data store 102, and thus these data blocks may need to be uploaded by the sender 150. In addition, the mapping cache 130 needs to be updated to avoid future false positive hits.

FIG. 3 is a flowchart of a technique for validating the presence of data blocks indicated by mapping cache hits in the deduplication data dictionary that may be used at element 210 of FIG. 2 in at least some embodiments. In at least some embodiments, the technique of FIG. 3 may be applied by the data plane 110 for each index returned from the mapping tier 104. As indicated at 300, the data plane 110 may check the data store 120 for presence of the chunk indicated by the index. For example, each index may include at least a chunk identifier, and the receiver-side deduplication process 112 may query a block data store process 114 with the chunk identifier to determine if the chunk 122 is present in data store 120.

If a chunk 122 indicated by an index is not present in the data store 120, then the deduplication data block that was previously stored in the chunk 122 is not present in the deduplication data dictionary 102, and thus the corresponding cache entry need to be deleted to prevent further false positive hits. In addition, the respective data block may need to be uploaded from the client. At 302, if it is determined that a chunk 122 indicated by an index returned from the mapping tier 104 is not present in the data store 120, then the corresponding entry may be deleted from the mapping cache 130, as indicated at 304. For example, a receiver-side deduplication process 112 may direct the mapping tier 104 to delete the key/value pair(s) 132 corresponding to the chunk 122 that was determined to be not present in data store 120. As indicated at 306, an indication may be recorded that the respective data block is not in the deduplication data dictionary 102. At 302, if it is determined that a chunk 122 indicated by an index is present in the data store 120, an indication may be recorded that the respective data block is in the deduplication data dictionary 102.

Thus, the data plane 110 now may have the following information for the fingerprints that it received from the sender 150:

- A list of fingerprints of data blocks that are not in the deduplication data dictionary 102. This list may include fingerprints for which there was no hit in the cache 130 and/or fingerprints for which there was a hit in the cache 130, but for which the respective deduplication data blocks were found to not be present in the data store 120; and
- A list of fingerprints of data blocks that are in the deduplication data dictionary 102. This list includes fingerprints for which there was a hit in the cache 130 and for which the respective deduplication data blocks were found to be present in the data store 120.

Note that in some cases, one (but not both) of the above two lists may be empty. That is, it may be the case that none of the data blocks indicated by the fingerprints are in the deduplication data dictionary 102, or that all of the data blocks indicated by the fingerprints are in the deduplication data dictionary 102.

Referring again to FIG. 2, as indicated at 212, the data plane 110 (e.g., a receiver-side deduplication process 112) may return information to the sender 150 (e.g., to sender data upload process 160) identifying one or more data blocks that need to be uploaded. This information may, for example, include the fingerprints of data blocks for which there is deduplication data in the deduplication data dictionary 102. Alternatively, this information may include the fingerprints of data blocks for which there is no deduplication data in deduplication data dictionary 102. As another alternative, this information may include all of the fingerprints with an indication for each as to whether there is corresponding deduplication data in deduplication data dictionary 102. Note that only the blocks for which there is no deduplication data in deduplication data dictionary 102 may need to be uploaded.

In some embodiments, instead of returning some or all of the fingerprints, other information may be returned to indicate which data blocks need to be uploaded. For example, in some embodiments, a binary string or byte string may be returned that indicates, for all of the data blocks in a chunk, which data blocks need to be uploaded and which do not need to be uploaded. As a non-limiting example, a "1" at position n of the string may indicate that the data block at position n of the chunk is not in the data deduplication dictionary 102 and thus needs to be uploaded, while a "0" at position n of the string may indicate that the data block at position n of the chunk is in the data deduplication dictionary 102 and thus does not need to be uploaded.

As indicated at 214, the sender 150 uploads the data blocks that were identified as needing to be uploaded to the data plane 110. For example, sender data upload process 160 may send the data blocks in one or more packets to a block data store process 114. The data plane 110 then constructs and uploads a new chunk to the data store 120. The new chunk may include the data blocks received from the sender 150 and deduplication data blocks retrieved from the data store 120. In at least some embodiments, a new data block may be stored in data store 120 while leaving the previous data block in the data store 120. The previous data block 120 may later be garbage collected. Alternatively, in some embodiments, the new data block may overwrite the previous data block that is being updated. An example technique for constructing and storing new data blocks to the data store 120 is given in FIG. 4.

FIG. 4 is a flowchart of a technique for constructing and uploading new chunks to the data store, according to at least some embodiments. As indicated at 400, the data plane 110 retrieves chunk(s) 122 that include the deduplication data blocks from the data store 120. For example, a block data store process 114 that received the data blocks uploaded from sender 150 may also have access to the cache hit information (e.g., the indexes) obtained from the mapping tier 104 at element 304. The block data store process 114 may retrieve each chunk 122 indicated by the indexes from the data store 120. Note that, in retrieving a chunk 122, a copy of the chunk 122 may be downloaded from the data store 120; the chunk 122 remains in the data store 120.

As indicated at 402, the data plane 110 extracts the deduplication data blocks 124 indicated by the cache hit information from the chunk(s) retrieved from the data store 120. For example, each index may include, in addition to a chunk identifier, at least an offset into the chunk 122 at which the respective data block 124 is stored. In some implementations, the index may also include a size (e.g., in bytes) of the data block 124. The block data store process 114 may use this information from the index to extract the data block 124 from the chunk 122.

In some embodiments, instead of downloading the entire chunk(s) from data store 120 and extracting the deduplication data blocks, only the deduplication data blocks may be downloaded from the data store 120.

As indicated at 404, the data plane 110 may retrieve data blocks from a chunk in the data store 120 that is being updated by the sender 150. In some embodiments, this may be performed by downloading a copy of the entire chunk from the data store 120 and extracting the needed data blocks. Alternatively, instead of downloading a copy of the entire chunk from data store 120 and extracting the data blocks, only the necessary data blocks may be downloaded from the data store 120.

Note that, in most cases, deduplication data blocks for a chunk being updated may be stored in one or more other chunks in the data store 120. However, in some cases, for example on a first update of a chunk that was previously uploaded by the sender 150, all of the deduplication data blocks for a chunk may actually be in the chunk itself, as indicated by the mapping cache 130 which was updated with fingerprints and indexes for all of the data blocks in the chunk when the chunk was originally uploaded.

As indicated at 406, the data plane 110 (e.g., the block data store process 114) constructs a new chunk 122 that may, but does not necessarily, include one or more deduplication data blocks 124 extracted from the chunk(s) retrieved from the data store 120, one or more data blocks retrieved from the chunk being updated, and one or more data blocks received from the sender 150. As indicated at 408, the data plane 110 uploads the new chunk 122 to the data store 120. Note that, in uploading the new chunk 122, a chunk identifier may be assigned to the chunk 122. In at least some embodiments, a new data block may be stored in data store 120 while leaving the previous data block in the data store 120. The previous data block 120 may later be garbage collected. Alternatively, in some embodiments, the new data block may overwrite the previous data block that is being updated.

As indicated at 410, the data plane 110 updates the mapping cache 130 via the mapping tier 104 with fingerprints and indexes for all of the data blocks 124 in the new chunk 122. For example, a data plane 110 process (e.g., a block data store process 114) may generate fingerprints for each data block 124 in the new chunk 122, construct an index (e.g., chunk identifier, offset, size) for each data block 124, and send the fingerprints and corresponding indexes to the mapping tier 104. The mapping tier 104 then writes the fingerprints and indexes as new key/value pairs 132 to the cache 130.

Figure 5A:
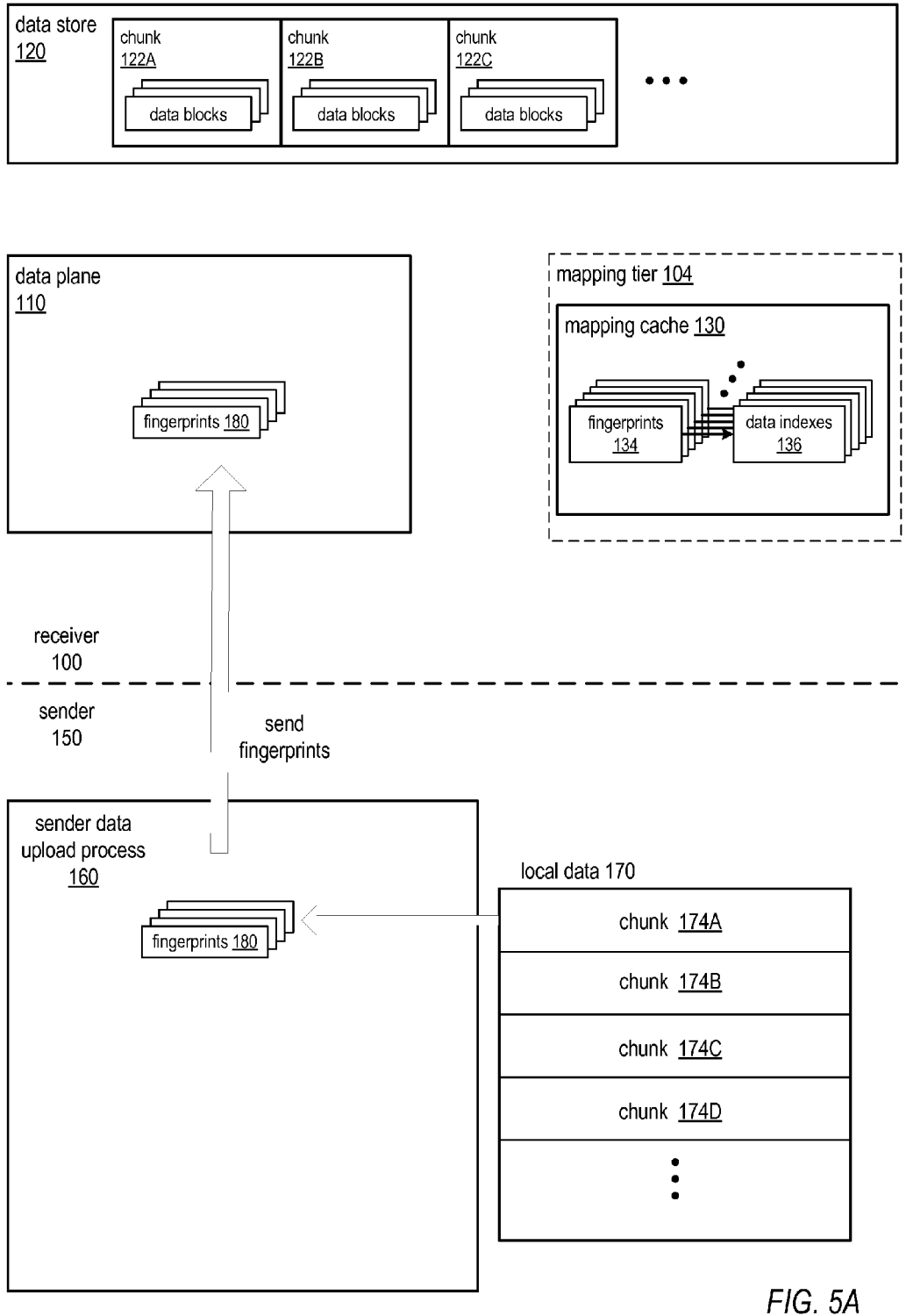
FIGS. 5A through 5H graphically illustrate data flow in the receiver-side deduplication architecture and technique, according to at least some embodiments.

FIGS. 5A through 5H graphically illustrate data flow in the receiver-side deduplication architecture and technique, according to at least some embodiments. Referring to FIG. 5A, receiver 100 implements a deduplication data dictionary that includes a mapping tier 104 and data store 120, and includes a data plane 110 that implements block data store processes and receiver-side deduplication processes, as described herein.

Sender data upload process 160 may act as an interface between sender 150 and data plane 110. Sender data upload process 160 may be implemented in hardware, software, or a combination thereof. In some implementations, sender data upload process 160 may be a process of or executing on a storage gateway 284 as shown in FIG. 7. The communications channel(s) between sender data upload process 160 and data plane 110 may be a relatively high-bandwidth connection or communications channel, as large amounts of data may need to be transferred across the network (e.g., the Internet) between sender data upload process 160 and data plane 110.

Sender 100 may locally cache, store, or obtain data; receiver 100 may serve as a primary store or backing store for the data. As a non-limiting example, to improve data access times for users, rather than retrieving data from a data store 120 maintained by receiver 100 on demand, large blocks or chunks of data, even entire volumes of data, may be locally cached or stored at sender 150 as local data 170. As another example, sender 100 may maintain local data 170 as a local primary data store and use data store 120 as a backing or mirroring data store for the local primary data store. Sender 100 may include physical data storage and/or memory on which local data 170 may be cached and/or stored. The data store 120 maintained by receiver 100 may thus serve as a primary data store or as a backing or mirroring data store for the client (sender 100. In either case, sender data upload process 160 may communicate with data plane 110 to periodically, aperiodically, or continuously upload new or modified data in local data 170 to the data store 120 provided by the receiver 100.

Sender data upload process 160 may, in at least some embodiments, maintain local data 170 in relatively large blocks or chunks, e.g. 4-megabyte chunks or 10-megabyte chunks, although larger or smaller chunk sizes may be used. Note that the chunk size used in local data 170 of sender 150 may be, but is not necessarily, the same as the chunk size used in data store 120. When a chunk 174 (e.g., chunk 174A) is accessed by a user or process at sender 100, e.g. to create new data or modify existing data, the chunk 174A may be marked as dirty. However, the access may have changed only a small portion of the chunk 174A. Thus, as shown in FIG. 5A, the sender data upload process 160 may generate fingerprints 180 for units (data blocks) of the dirty chunk 174A, for example by applying a hash function to each data block, or to only some of the data blocks, in the dirty chunk 174A. In block-based data systems (for example, block storage systems), a unit of data may, for example, be a 128 k-byte data block, a 256 k-byte data block, a 1024 k-byte data block, or some other fixed or variable sized data block. (In file-based systems, a data block may be a file, or a portion of a file similar to the data blocks of a chunk in a block-based data system). As shown in FIG. 5A, the sender data upload process 160 may send the fingerprints 180 that were generated for the dirty chunk 174A to the data plane 110 of the receiver 100.

Figure 5B:
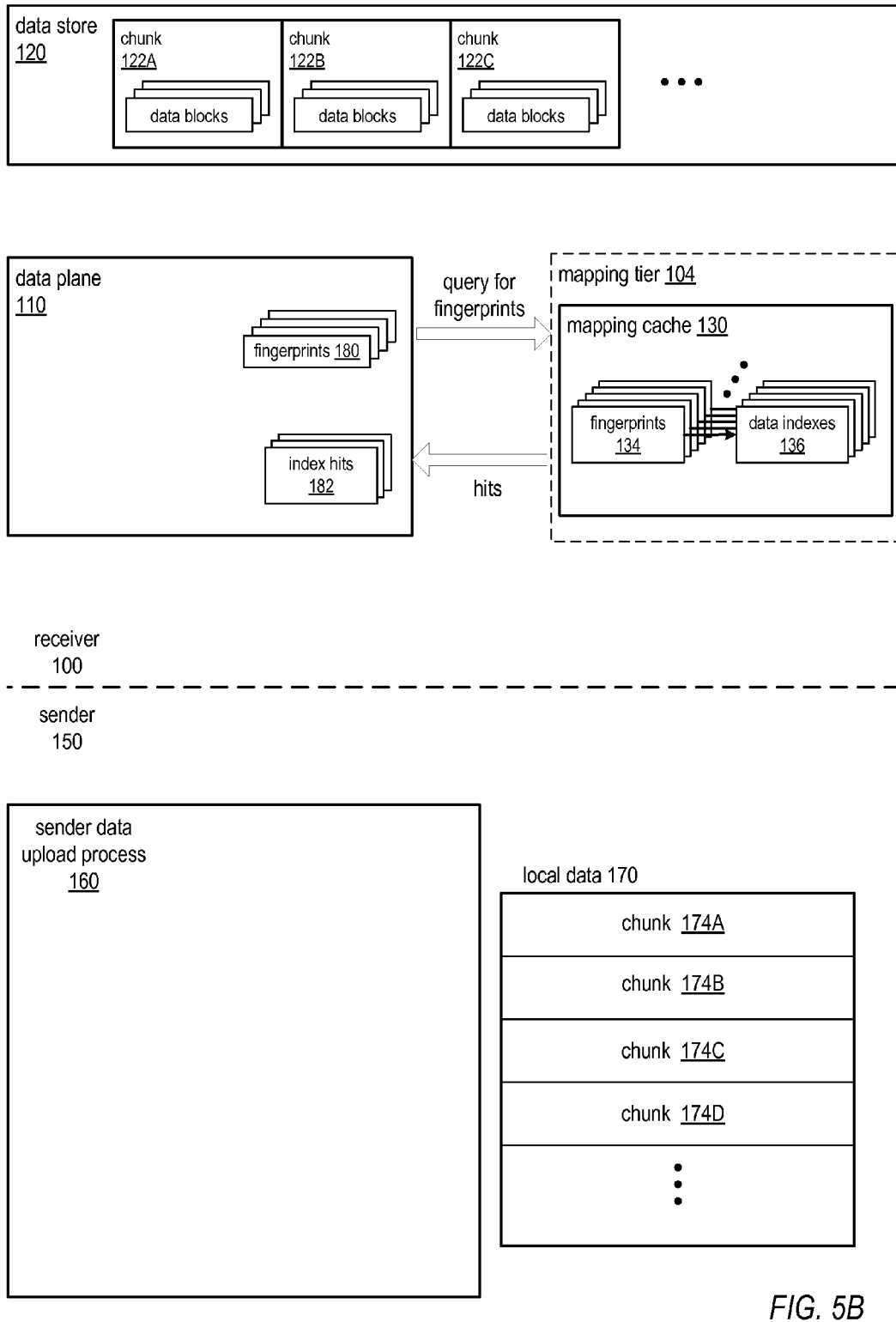

Referring to FIG. 5B, in response to receiving the fingerprints 180 from the sender 150, the data plane 110 of the receiver 100 may query the mapping tier 104 with the fingerprints 180. Mapping cache 130 stores previously received fingerprints 134 and data indexes 136 as key/value pairs. In at least some embodiments, standard or commodity caching technology (e.g., Memcached technology) may be leveraged to implement mapping tier 104 and mapping cache 130. The mapping tier 104 checks mapping cache 130 for hits on the fingerprints 180. If a fingerprint 134 in mapping cache 130 matches a fingerprint 180 received from sender 150, the corresponding data index 136 is returned to data plane 110 as an index hit 182. Note that there may be hits on one or more, or all, of the fingerprints 180. However, in some cases, there may be no hits on the fingerprints 180.

Figure 5C:
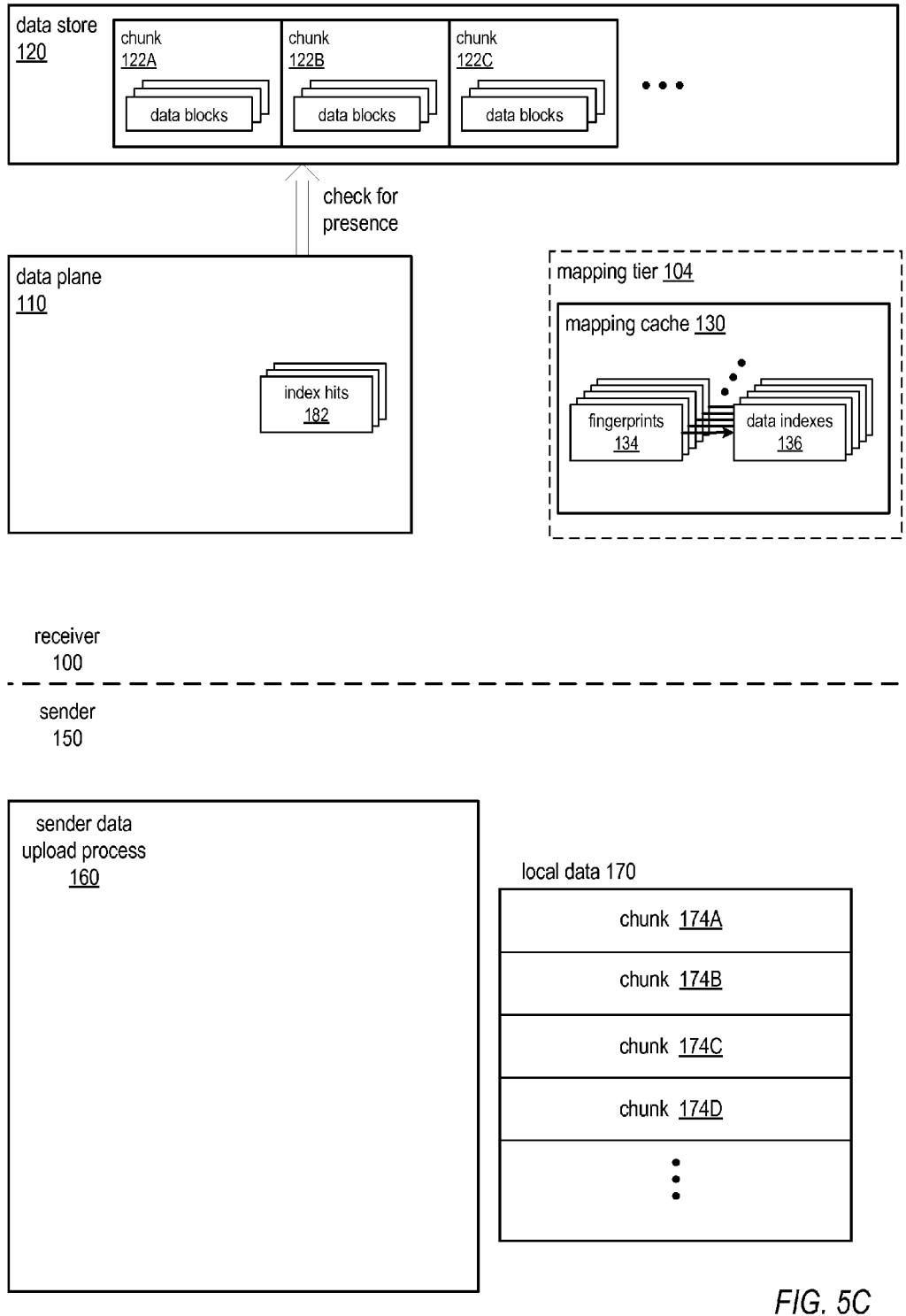
Figure 5D:
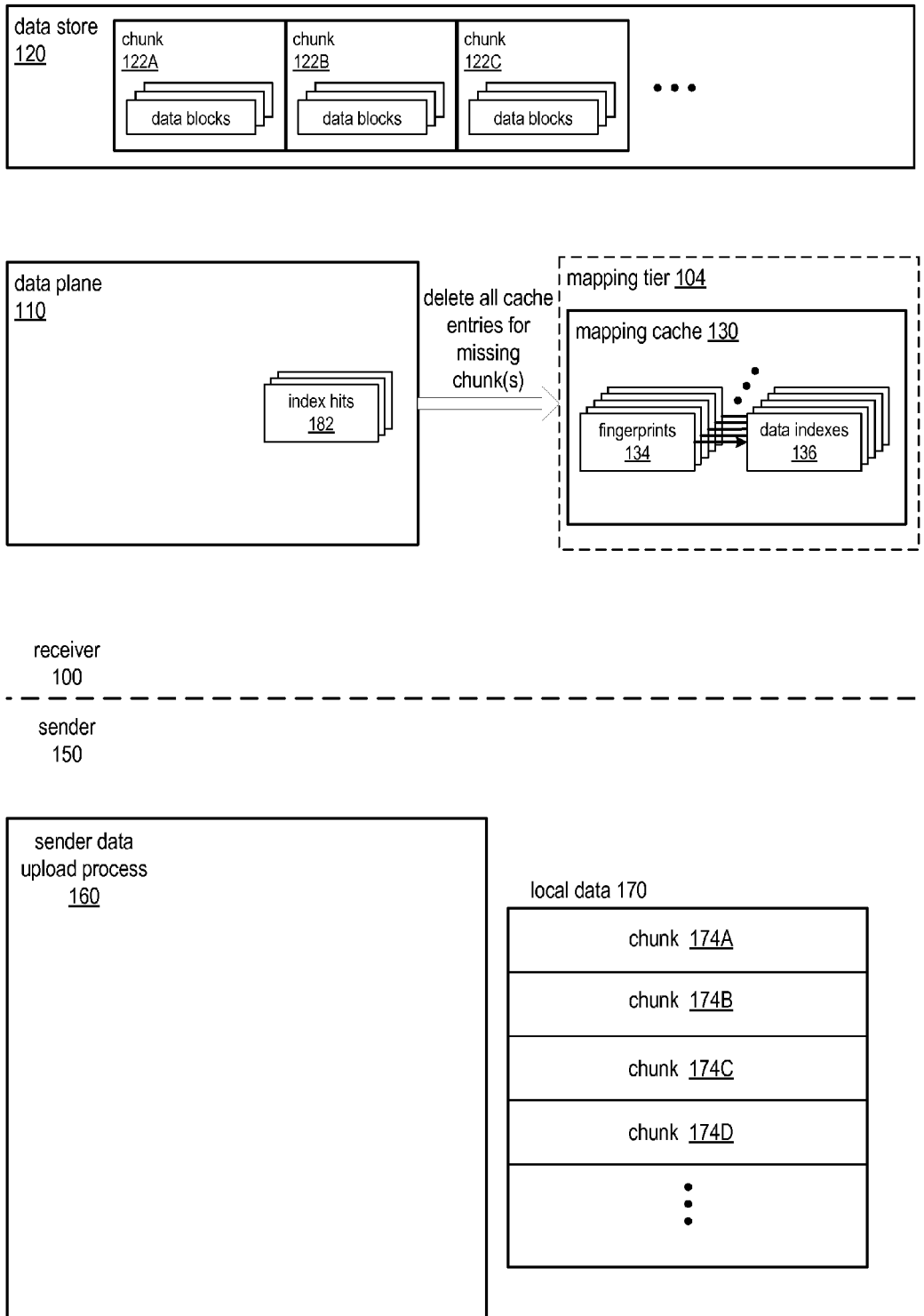

Referring to FIG. 5C, the data plane 110 validates the presence of the chunk(s) 122 indicated by the index hits 182 in the data store 120. As previously mentioned, in some implementations of data store 120, the chunks 122 may be immutable (guaranteed to be valid if they are present in data store 120). However, stale chunks 122 may have been garbage collected. Referring to FIG. 5D, if it is determined that a chunk or chunks 122 indicated by the index hits 182 are not present in the data store 120, then the data plane 110 may direct the mapping tier 104 to delete the key/value pair(s) in mapping cache 130 corresponding to the chunk(s) 122 that are not present in data store 120. Note that, if a chunk 122 indicated by an index is not present in the data store 120, the corresponding cache entries need to be deleted to prevent further false positive hits. In addition, the respective data blocks may need to be uploaded from the sender 150.

Figure 5E:
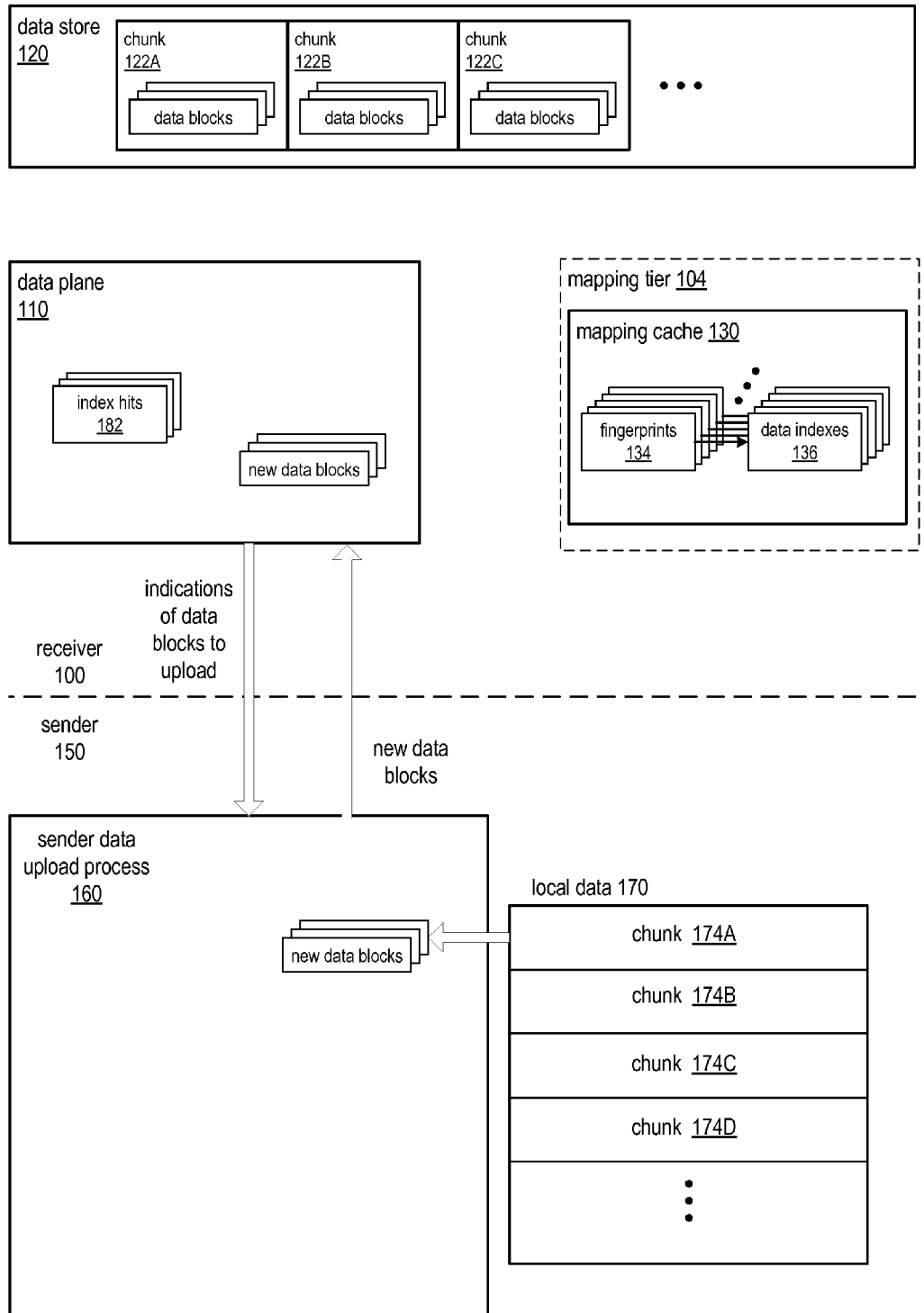

Referring to FIG. 5E, the data plane 110 may determine, from the index hits 182 and according to the check for presence of chunks 132 as shown in FIGS. 5C and 5D, which of the data blocks need to be uploaded to the receiver 100 by the sender 150. The data plane may then send indications of the data blocks to be uploaded to the sender data upload process 160. The sender data upload process 160 may then extract the indicated data blocks (shown as new data blocks) from local data 170 (e.g., from data block 174A) and send the new data blocks to data plane 110.

Figure 5F:
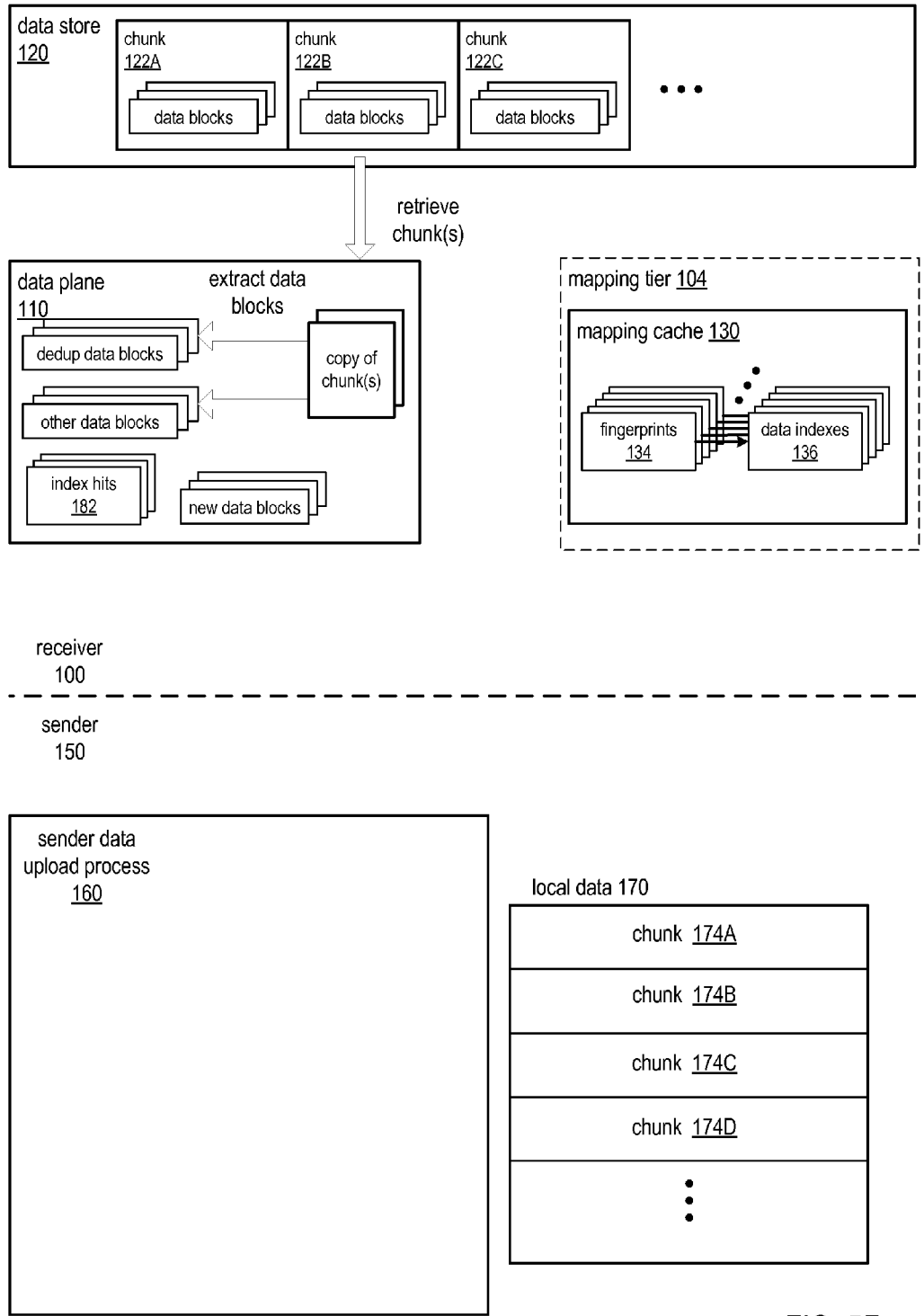

Referring to FIG. 5F, the data plane 110 retrieves one or more chunks 122 including chunk(s) that include the deduplication data blocks indicated by the index hits 182 from the data store 120. The data plane 110 may also retrieve the chunk being updated from the data store 120. For example, if chunk 122C is the chunk being updated by the sender 150, and chunks 122A and 122B include deduplication data blocks as indicated by the index hits 182, then the data plane 110 may retrieve chunks 122A, 122B, and 122C from the data store 120. Note that, in retrieving a chunk 122, a copy of the chunk 122 may be downloaded from the data store 120; the chunk 122 remains in the data store 120. The data plane 110 extracts the deduplication data blocks indicated by the index hits 182 from the chunk(s) retrieved from the data store 120. For example, each index hit 182 may include, in addition to a chunk identifier, at least an offset into the chunk 122 at which the respective data block is stored. In some implementations, the index hit 182 may also include a size (e.g., in bytes) of the data block. The data plane 110 may use this information from the index hits 182 to extract the data block(s) from the chunk(s) retrieved from data store 120. The data plane 110 may also extract other data blocks from the chunk being updated. In some embodiments, instead of retrieving the entire chunks and extracting the data blocks from the retrieved chunks 122, only the data blocks and/or the deduplication data blocks may be retrieved from chunks 122 in the data store.

Figure 5G:
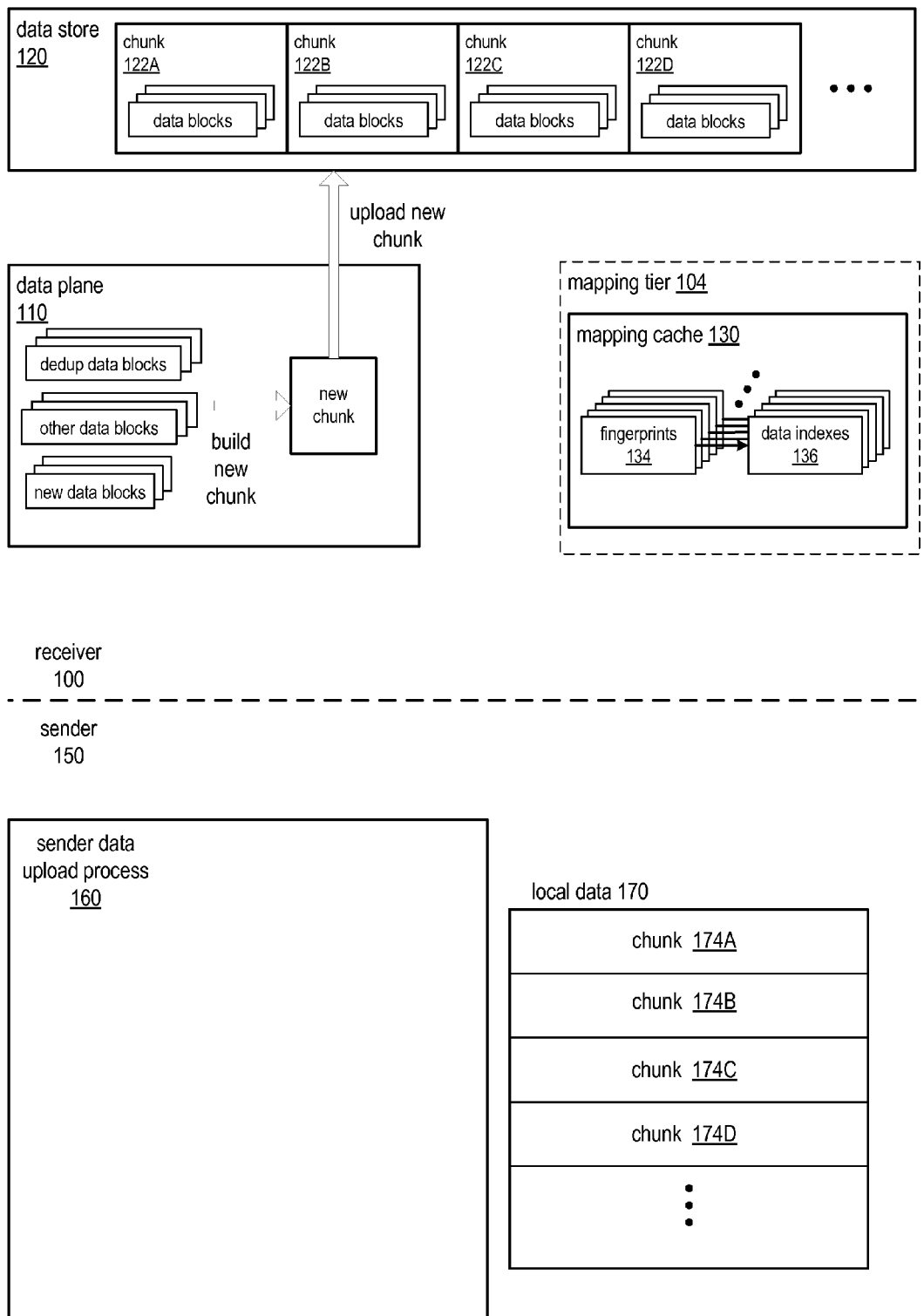

Referring to FIG. 5G, the data plane 110 constructs a new chunk 122 that includes the deduplication data blocks extracted from the chunk(s) retrieved from the data store 120, the other data blocks extracted from the chunk being updated, and the new data blocks received from the sender data upload manger 160. The data plane 110 uploads the new chunk 122 to the data store 120. Note that, in uploading the new chunk, a chunk identifier may be assigned to the chunk (the new chunk is shown as chunk 122D in data store 120). As shown in FIG. 5G, the new chunk 122 may be written as a new chunk 122D while leaving the chunk being updated (e.g., chunk 122C) in the data store. Alternatively, the chunk being updated (e.g., chunk 122C) may be overwritten with the new chunk 122.

Figure 5H:
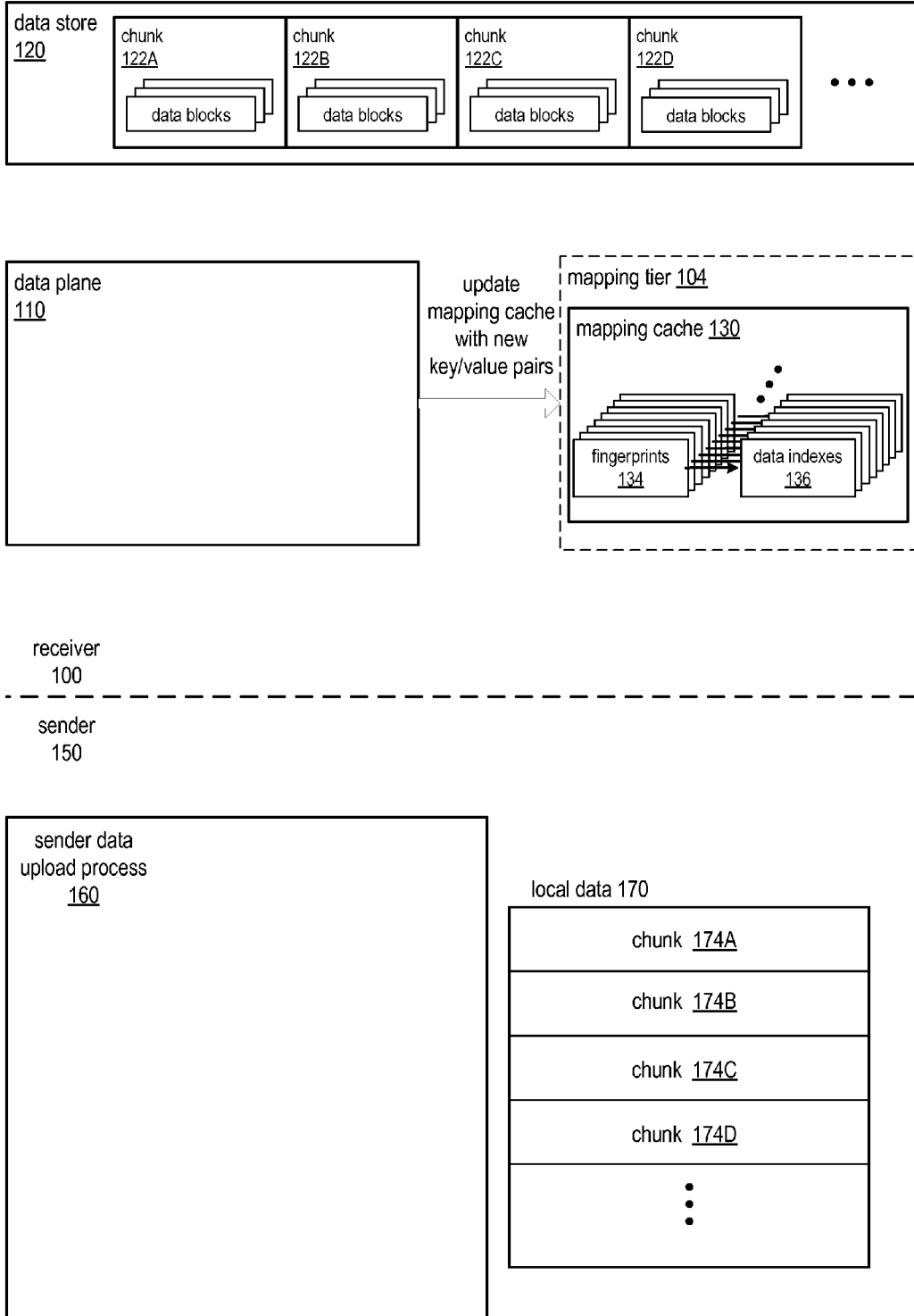

Referring to FIG. 5H, the data plane 110 updates the mapping cache 130 via the mapping tier 104 with fingerprints and indexes for all of the data blocks in the new chunk 122D. For example, a data plane 110 process may generate fingerprints (e.g., hashes) for each data block in the new chunk 122D, construct an index (e.g., chunk identifier, offset, size) for each data block, and send the fingerprints and corresponding indexes to the mapping tier 104. The mapping tier 104 then writes the fingerprints and indexes as new key/value pairs to the cache 130.

Mapping Cache Implementations and Optimizations

In at least some embodiments of the receiver-side deduplication architecture, a cache service provided by a service provider may be leveraged to provide the mapping tier of the deduplication data dictionary. In at least some embodiments, the mapping cache may be implemented according to high-speed caching technology, for example an in-memory cache. In at least some embodiments, standard or commodity caching technology (e.g., caching Memcached technology) may be leveraged to implement the mapping cache and mapping tier.

In at least some embodiments, the deduplication technique may use information about the age or activity of a chunk to be replaced to mitigate cache updates. For example, the deduplication data dictionary may prioritize data blocks that do not change constantly. In at least some embodiments, an eviction mechanism used with the mapping cache may be driven by how recently fingerprints (e.g., hash values) were looked up or updated in the cache. In at least some embodiments of the cache eviction mechanism, more recent fingerprints may be retained in the cache, while fingerprints that have not been active for a specified period may be evicted from the cache. Note that other cache eviction techniques may be implemented in some embodiments.

Figure 6:
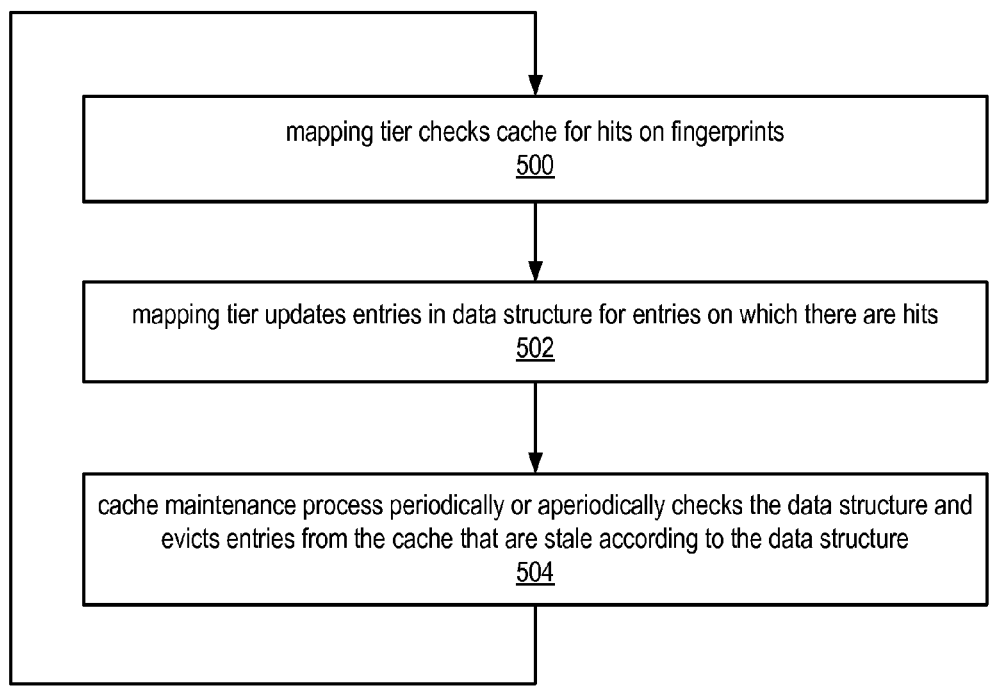
FIG. 6 is a flowchart of a cache eviction method, according to at least some embodiments.

FIG. 6 is a flowchart of a cache eviction method, according to at least some embodiments. This method may be based on the assumption that, if there have been few or no deduplication hits for an entry in the past, then it is likely that there will be few or no deduplication hits for the entry in the future. For example, when checking the mapping cache for entries as indicated at 500, the mapping tier may update a data structure in which the mapping tier tracks hits to mapping cache entries as indicated at 502. At least some mapping cache entries that do not get hit often (more than a certain threshold) or that aren't hit for a specified period (i.e., are stale) may be evicted from the cache according to the tracking information in the data structure, for example by a background cache maintenance process that periodically or aperiodically checks the data structure as indicated at 504.

To process a deduplication data upload request from a sender, the data plane may download at least one large (e.g., 4 mB) chunk from the data store, create a new chunk, and upload the new chunk to the data store, even if the deduplication data for the request is small (e.g., just one or a few data blocks, e.g. one or a few 4 kB data blocks). In at least some embodiments of the receiver-side deduplication architecture and technique, on every data upload request from a sender (including deduplication requests and regular data write requests), after the new chunk(s) are written to the data store, the data plane computes the fingerprint (e.g., hash) for every data block on the new chunk(s) and updates the mapping tier with this information. (See, e.g., FIG. 5H). There may be many data blocks in a chunk. For example, with a chunk size of 4 mB and a data block size of 4 kB, every chunk upload to the data store will result in 1 k (1000) cache put operations to the mapping cache. If there are many upload requests, a bottleneck could occur in bandwidth between the data plane and the mapping tier and/or at the mapping cache due to the large volume of cache update operations that would result. In at least some embodiments, one or more of several techniques as described below may be implemented to help prevent or reduce these potential bottlenecks by reducing the overhead of updating all cache entries on every chunk write to the data store. These techniques may be in place all the time, or alternatively may only be invoked at times of high activity when such a bottleneck has occurred or may potentially occur.

One technique that may be used in at least some embodiments is to reduce the ratio of the data block size to the chunk size, for example by reducing the chunk size, to thus reduce the number of data blocks per chunk, which would reduce the number of cache updates per chunk write to the data store. For example, reducing the number of data blocks per chunk from 1000 to 500 would cut the number of cache updates in half.

In at least some embodiments, the deduplication data upload technique may only be used for chunks for which some threshold portion of the chunk may be deduplicated. Otherwise, the sender just sends the data via a normal data upload operation that does not use the deduplication technique. For example, with a chunk size of 4 mB and a block size of 4 kB, the deduplication technique may only be used if there are 16, 32, or some other threshold number of data blocks that may be deduplicated, or alternatively if there is 64 kB, 128 kB, or some other threshold amount of data that may be deduplicated.

In at least some embodiments, the deduplication technique may employ a "best effort" cache update process to update the mapping cache for new chunks uploaded to the data cache. The cache update process may attempt to update the mapping cache for all chunk uploads to the data store, but at peak times the process may skip the cache update for at least some chunks. For example, in some embodiments, the cache update process may be implemented as a background process. When uploading new chunks, the chunks may be uploaded to the data store and separately queued (e.g., to a FIFO queue) for handling by the cache update process on the data plane. If the queue gets full, one or more of the chunks in the queue may be discarded; the cache is not updated for the discarded chunks. Note that this does not cause a problem with or any corruption in the deduplication data dictionary.

In at least some embodiments, the deduplication technique may limit cache updates to larger write requests. For example, if only a relatively small portion (e.g., only one or a few data blocks, below some specified threshold) of a chunk is "dirty" and needs to be uploaded, the deduplication process may be skipped for this data upload, and a normal (non-deduplication) data upload may be used instead. Thus, the mapping cache may not be checked or updated for relatively small writes.

In at least some embodiments, the mapping cache may be implemented as a two-tiered or two-stage cache. In this implementation, instead of each index in the key/value pairs stored in the cache including a chunk identifier that identifies the chunk in which the respective deduplication data block is stored, each index includes a pointer or reference (e.g., a key) to a location in the cache that stores the chunk identifier. Thus, in at least some cache updates, only the location that includes the chunk identifier for multiple key/value pairs may need to be updated, instead of the index in each of the key/value pairs for the respective chunk.

Thus, in the two-stage cache, there are two types of cache entries. The first type of cache entry are the key/value pairs that each maps a fingerprint to a data block location within a chunk, and also points to one of the second type of cache entry. Each of the second type of cache entry identifies a particular chunk within the data store in which deduplication data blocks are stored. The key/value pairs may be referred to as first-level cache entries, and the cache entries identifying the chunks within the data store may be referred to as second-level cache entries.

As an example of using the two-stage cache described above, a deduplication data upload request may be received for one data block of a chunk. The data plane retrieves the chunk from the data store, builds the new chunk including the new data block, and then uploads the new chunk to the data store. The data plane has knowledge of the original chunk, and thus can determine which cache entries will be invalidated by the update. For example, the data plane may calculate the fingerprint (e.g., hash) for the old data block (the one being replaced by the new data block), invalidate that particular cache entry via the mapping tier, update the mapping cache with the fingerprint and index information of the new data block in the new chunk, and upload the new chunk to the data store. For the new chunk, the data plane knows that all data blocks except for the new data block are valid. The data plane then updates the second level entry in the cache to indicate the new chunk. All of the key/value pairs for the chunk point to this updated second level entry except for the key/value pair for the new data block.

In at least some embodiments, when updating a chunk, if only a small part of the chunk is being replaced (e.g., fewer than a specified number of data blocks), then the following method may be used to update the two-stage cache:
- The data blocks that are being changed are identified, and their fingerprints are calculated.
- Current first level cache entries corresponding to those fingerprints are deleted from the cache.
- The second level cache entry corresponding to the chunk is modified to reflect the replacement of the old version of the chunk with the new version of the chunk.
- First level cache entries for the new data blocks in the chunk are added to the cache.

In at least some embodiments, when updating a chunk, if a relatively large part of the chunk is being replaced (e.g., more than a specified number of data blocks), then the following method may be used to update the two-stage cache:
- All of the current first level cache entries corresponding to data blocks in the chunk may be deleted.
- The second level cache entry corresponding to the chunk is modified to reflect the replacement of the old version of the chunk with the new version of the chunk.
- First level cache entries for the all of the data blocks in the chunk are added to the cache.

In at least some embodiments, the cache eviction algorithm may be tuned so that the second level entries are preferentially NOT evicted.

Mapping Cache Updates and Snapshots

A service provider that provides a data store may allow clients to create snapshots of volumes on the data store. The snapshots may, for example, be used to create or recover local volumes on the client's network from the remotely stored snapshots. When a snapshot of a volume is taken, a snapshot manifest file that describes the snapshot may be created. A snapshot may be viewed as an immutable, point-in-time capture of a corresponding volume; a snapshot includes the snapshot data and a snapshot manifest that indicates where the snapshot data (chunks) is located. In some implementations, when a snapshot of a volume is taken, the snapshot data is not copied to another location but is instead made immutable within the volume. Alternatively, when or after a point-in-time snapshot of a volume is taken, the snapshot data from the volume may be copied to new locations in the data store, essentially creating a new and separate point-in-time snapshot of the volume. A snapshot manifest file for a snapshot may include entries that map the storage locations of all of the snapshot objects (chunks) stored in the data store to the blocks/chunks of the volume.

As previously noted, the chunks in the data store may be immutable (guaranteed to be valid if they are present in the data store). Thus, when updating a chunk via the deduplication process, a chunk is created and uploaded to the data store as a new chunk, and the respective "old" chunk is not overwritten or updated However, stale chunks may be periodically or aperiodically garbage collected. A motivation for updating the mapping cache for each new chunk to be uploaded to the data store is that the respective old chunks in the data store may be discarded (e.g., by a garbage collection process), and thus the cache entries for the old chunk may be stale as well.

However, if these old chunk(s) are part of a snapshot, the old chunks are not considered stale and are not likely to be garbage collected soon. Thus, in at least some embodiments, the deduplication cache update process may check to see if old chunks are part of any snapshot (e.g., by querying a snapshot maintenance process or by checking the snapshot manifests). If an old chunk is part of a snapshot, then the mapping cache entries for data blocks in the chunk that are not affected by the respective deduplication data upload do not have to be updated.

Data Object Versioning

In some block-based data storage systems, the data objects (e.g., chunks) may be versioned. For example, there may be a version identifier as well as a chunk identifier for each chunk. When a new chunk is created, a new value for a version identifier may be given to the new chunk. Thus, there may be one or more older versions and a newest version of a chunk in the data store. Note that all of these chunks would have the same chunk identifier, but each may have a different version identifier. In these implementations, the indexes stored in the mapping cache may also include a version identifier. In deduplication operations such as validating the presence of chunks in the data store according to index hits retrieved from the mapping cache, the version identifier may be used in addition to the chunk identifier.

Data Deduplication

As previously mentioned, embodiments of the receiver-side deduplication architecture and deduplication techniques may provide network deduplication by reducing bandwidth usage on the communications channel(s) between data sender(s) and the receiver (the data store provider). However, while primarily directed to network deduplication rather than data deduplication, some embodiments may also improve storage utilization in the data storage system by reducing the amount of data that is actually stored.

In some embodiments, to provide data deduplication in addition to network deduplication, instead of retrieving copies of the chunks from the data store, extracting the deduplication data blocks from the chunks, and building new chunks that include the deduplication data blocks and the new data blocks uploaded from the sender as shown in FIGS. 5F and 5G, references to the locations of the deduplication data blocks in the chunks in the data store may be stored in the new chunk. Note that the reference information is available in the index information obtained from the mapping tier.

In this case, since references are stored to the new chunk and not the data blocks themselves, then the chunk(s) that are referenced should not be garbage collected. In some embodiments, to prevent the referenced chunks from being garbage collected, a mechanism may be provided that increments or decrements a reference count for each referenced chunk. Chunks that have a reference count higher than zero may not be garbage collected.

Example Implementation

Embodiments of the receiver-side deduplication architecture and technique may, for example, be implemented in the context of a service provider that provides remote, volume-based block storage to one or more service client networks or data centers as a remote data store. The service provider may provide, via a local storage gateway over an intermediate network such as the Internet, a storage service to one or more customers of the service provider. The storage service interface may be implemented as a Web service interface. The storage gateway may be implemented as a virtual or physical appliance that is installed on-premise at a client's data center and may act as a gateway between the client's data center and the storage service. The storage gateway may, for example, be configured as an interface to and local cache for a primary storage provided remotely via the storage service and/or as an interface that shadows primary storage implemented on the client's network to remote storage provided by the storage service. The storage gateway may present standard data access interfaces to the client's applications at the front-end of the appliance, convert the data accesses into storage service requests at the back-end of the appliance, and transfer the data over the network to the storage service according to the storage service interface. The storage service may store the client's data in the remote data store according to block storage technology. The storage gateway may expose block storage protocols (e.g., iSCSI, GNBD (Global Network Block Device), etc.), file storage protocols (e.g., NFS (Network File Storage), CIFS (Common Internet File System), etc.), and/or object storage protocols (e.g., REST (Representational State Transfer)) at the front-end to the client's applications. A block storage protocol such as iSCSI may be used to enable direct access to the underlying data blocks of the remote data store.

Files written by an application to a remote data store via file storage protocols such as NFS or CIFS exposed by the storage gateway may be stored to the remote data store according to block storage technology. Through an exposed file storage protocol such as NFS and CIFS, the storage gateway presents the client's data, stored in the remote data store according to block storage technology, to the client's applications as files before they are transmitted from the gateway over the client network to the client's applications. The exposed block storage protocol, e.g. iSCSI, transfers the blocks to the client's applications, thus requiring the application to handle interpretation of the data blocks into whatever format the application expects.

Embodiments of the receiver-side deduplication architecture and techniques may be implemented on the service provider network to provide deduplication for data uploaded from storage gateways at the client's data centers. In some embodiments, receiver-side deduplication may be provided to the clients as a deduplication service that provides access to the deduplication techniques described herein to clients that store data to the remote data storage provided by the service provider via storage gateways at the client data centers. Alternatively, access to the deduplication techniques may be provided as part of the storage service. In at least some embodiments, access to the deduplication service or to the deduplication techniques may instead or also be provided to other client data processes that upload data to the remote data store.

FIG. 7 is a high-level block diagram of an example networking environment that includes an example service provider and an example client or service customer in which embodiments of the receiver-side deduplication architecture and techniques may be implemented. A storage gateway 284 may be installed, activated, and configured as a virtual or physical appliance in the service customer local network or data center (e.g., client network 280) to provide one or more of several remote data storage functionalities to customer process(es) 288 on the client network 280. A customer process 288 may be any hardware, software, and/or combination thereof that exists on the client network 280 and that can connect to and communicate with the storage gateway 284 via the data protocol of the gateway 284's data ports (e.g., the iSCSI protocol). The storage gateway 284 may, for example, serve as an on-premise storage device and/or as an interface between the customer process(es) 288 on the client network 280 and a storage service 264 provided by service provider 260. The storage service 264 may at least be partially implemented on a data plane 270 of the service provider 260 network. Note that, in addition to a storage service 264, the service provider 260 may also provide other services to customers of the service provider 260, including but not limited to a hardware virtualization service, a cache service as previously described herein, and/or a deduplication service that provides access to the deduplication techniques described herein to its customers that store data to the remote data storage. Alternatively, access to the deduplication techniques may be provided as part of the storage service 264.

A customer of the service provider 260 may be referred to as a service customer or simply customer, and may be any entity that implements a computer network or networks, coupled to an intermediate network 250 such as the Internet, to provide networked computing services to one or more users on a local network or network, including one or more services remotely provided by service provider 260. A service customer may be a business enterprise, an educational entity, a government entity, or in general any entity that implements a computer network or networks that provide networked computing services to users. While FIG. 7 shows a single client network 280, there may be multiple client networks 280. Each client network 280 may correspond to a different service customer, or two or more client networks 280 may correspond to different data centers or localities of the same service customer, for example different regional offices of a business enterprise or different campuses of a school system. In at least some embodiments, each customer of the service provider 260 may have an account with the service provider 260, and may be provided with security credentials (e.g., an account name and/or identifier, password, etc.) via which one or more customer representatives (e.g., a client network administrator) may log in to interfaces (e.g., Web pages) to the service provider 260 to manage the customer's resources provided by one or more services, including but not limited to a storage service, offered by the service provider 260.

Figure 8:
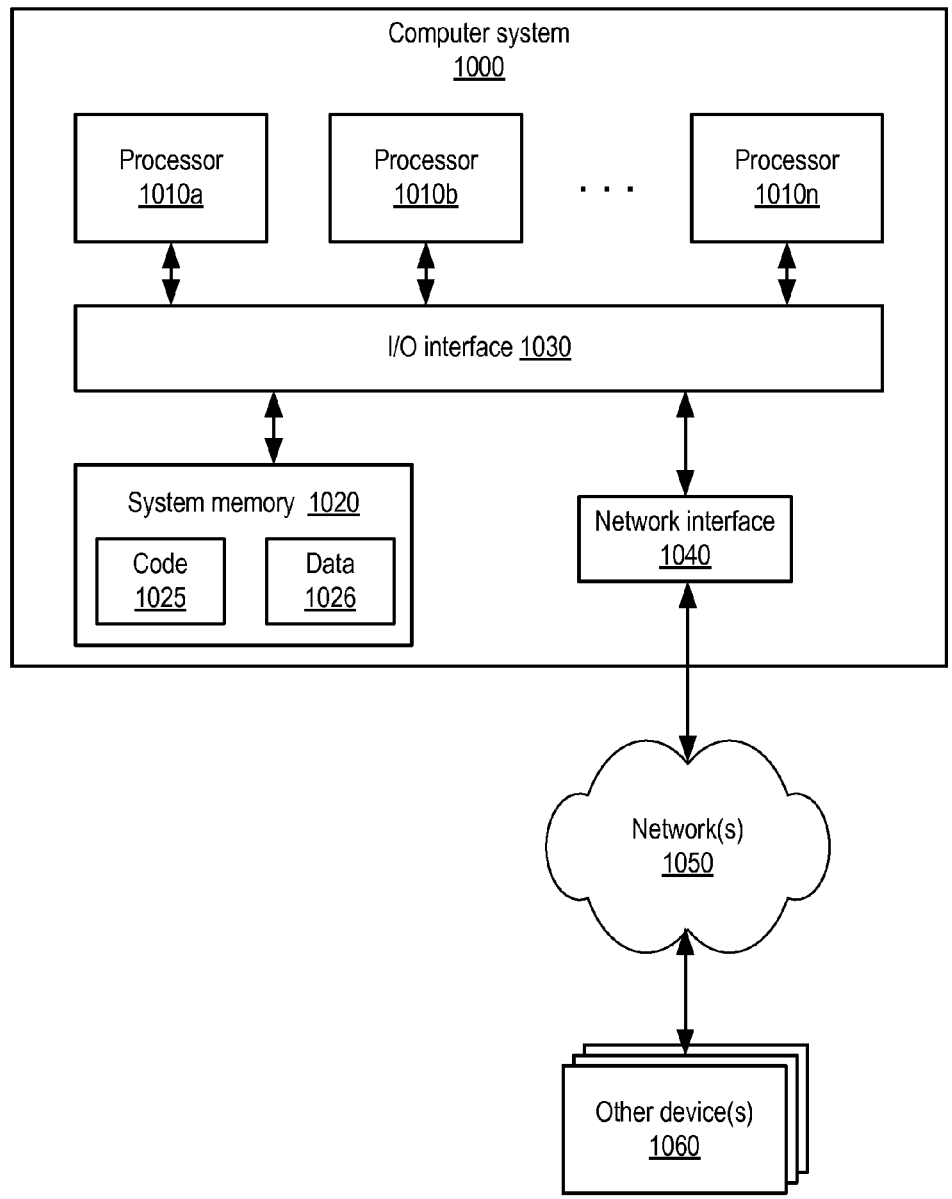
FIG. 8 is a block diagram illustrating an example computer system that may be used in some embodiments.

Embodiments of storage gateway 284 may be implemented in hardware, software, or a combination thereof. In at least some embodiments, storage gateway 284 may be implemented as a virtual appliance that may, for example, execute within a virtual machine instantiated on a host system. In at least some embodiments, storage gateway 284 may be implemented as a virtual appliance that may be downloaded or otherwise installed, activated, and configured on one or more computing devices such as server systems coupled to a local network infrastructure at a service customer's data center (e.g., client network 280). Alternatively, storage gateway 284 may be implemented as a dedicated device or appliance that may be coupled to a local network infrastructure at a service customer's data center (e.g., client network 280); the dedicated device or appliance may include software and/or hardware that implements the functionality of the storage gateway 284. FIG. 8 illustrates an example computer system on which embodiments of a storage gateway 284 may be implemented. In at least some implementations, storage gateway 284 communicates with the service provider 260 network via an intermediate network 250 (e.g., the Internet) through firewall 282 technology. Note that the service provider 260 network may also include front end 262 technology (e.g., firewall technology, border router technology, load balancer technology, etc.) through which network traffic from and to intermediate network 250 passes.

Embodiments of the storage gateway 284 may be installed, activated, and configured for use with a storage service 264 to provide one or more of several data store 266 functionalities. For example, a storage gateway 284 may be installed, activated, configured, and employed with a storage service 264 to serve as:

A file system gateway. In this configuration, the storage gateway serves as a NAS storage interface (e.g., using CIFS or NFS protocols) to the storage service 264. The remote data store 266 may be presented to the customer by the gateway 284 as an object store (e.g., REST), while the data store 266 is implemented according to block storage technology. In this configuration, the remote data store 266 may be presented to the customer as a virtualized file system to which the customer can write files and from which the customer can read files.

A cloud volume gateway. In this configuration, the storage gateway 284 serves as an interface to volume(s) implemented on remote data store 266 via the storage service 264. The remote data store 266 may be implemented using block storage technology. The gateway 284 provides local network access points, with the volume(s) on remote data store 266 (which may also be referred to as a cloud volume) serving as backend storage that provides flexible and essentially unlimited primary storage capacity. In this configuration, the remote data store 266 may be presented to the customer as a cloud volume system from which the customer can locally mount volumes for reading and writing data.

A shadowing gateway. In this configuration, the storage gateway 284 acts as a "bump in the wire" between a customer's applications (e.g., customer process(es) 288) and the customer's local data store 286 to provide shadowing of the customer's write data (e.g., iSCSI writes) to remote data store 266 via the storage service 284. The remote data store 266 may be implemented using block storage technology. In this configuration, the storage gateway 284 may serve as a shadowing appliance that shadows the customer's local data store to snapshot(s) on the remote data store 266. This shadowing may be performed transparently from the perspective of users on the local network. When necessary or desired, the customer may request or access snapshot(s) of the customer's data on the remote data store 266, for example to restore, recover, or copy portions or all of the customer's data from the snapshot(s) to a local store 286.

Note that the file system gateway and the cloud volume gateway are similar in that both serve as gateways to a remote data store, and both may locally cache data, e.g. frequently and/or recently used data. In both the file system gateway and the cloud volume gateway, data reads from customer processes may be serviced from the local cache, if possible, or from the remote data store if not. In contrast, in the shadowing gateway, data reads are passed through the gateway to the customer's local data store. The file system gateway and cloud volume gateway may collectively be referred to as cached gateways to distinguish these implementations from the shadowing gateway.

As shown in FIG. 7, service provider 260 network may implement an embodiment of the receiver-side deduplication architecture and techniques as described herein. One or more deduplication processes 272 may be implemented on data plane 270 (e.g., on host systems or servers), and a mapping tier 274 that includes and manages a mapping cache may be implemented as part of the deduplication data dictionary that includes the data chunks stored in remote data store 266. Data uploads from the storage gateway 284 may be handled according to the deduplication techniques, for example as described in reference to FIGS. 1 through 6. Referring to FIGS. 1 and 5A through 5H, the sender data upload process 160 may be a process of or executing on the storage gateway 284, and may be implemented in software, hardware, or a combination thereof. Referring to FIGS. 5A through 5H, local data 170 may be data cached on storage gateway 284 or data in local data store 286.

Illustrative System

In at least some embodiments, a server that implements a portion or all of one or more of the technologies, including but not limited to the data storage system technologies and deduplication technologies as described herein, may include a general-purpose computer system that includes or is configured to access one or more computer-accessible media, such as computer system 1000 illustrated in FIG. 8. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for data storage system technologies and deduplication technologies, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIGS. 1 through 7, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 7 for implementing embodiments of data storage system technologies and deduplication technologies. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   at least one processor; and
   a memory comprising program instructions, wherein the program instructions are executable by the at least one processor to:
      receive, from a device via a network, one or more fingerprints each identifying a different data block stored at the device;
      check a cache for hits on the one or more fingerprints;
      receive one or more cache hits for the one or more fingerprints each indicating an index to a location of a respective deduplication data block in a data store, wherein the data store stores data in chunks, each chunk including a plurality of data blocks;
      obtain, from the device via the network, one or more data blocks each corresponding to a fingerprint for which there was not a cache hit;
      build a new chunk comprising the one or more data blocks obtained from the device and one or more deduplication data blocks retrieved from the data store according to the cache hits;
      store the new chunk to the data store; and
      update the cache for the data blocks in the new chunk.

2. The system as recited in claim 1, wherein the new chunk further comprises one or more other data blocks retrieved from the data store, wherein the one or more other data blocks are retrieved from a chunk that is being updated with the data blocks obtained from the device.

3. The system as recited in claim 1, wherein the program instructions are further executable by the at least one processor to:
   check for presence in the data store of one or more chunks indicated by the one or more cache hits; and upon determining that a chunk indicated by the one or more cache hits is not present in the data store, delete one or more entries corresponding to the chunk from the cache.

4. The system as recited in claim 1, wherein, to check a cache for hits on the one or more fingerprints, the program instructions are executable by the at least one processor to send the one or more fingerprints to a mapping device, wherein the mapping device maintains the cache as a store of key/value pairs, wherein the keys are fingerprints of deduplication data blocks stored in the data store, and wherein the values are the indexes.

5. The system as recited in claim 4, wherein the mapping device provides a cache service implemented according to Memcached caching technology, and wherein, to check a cache for hits on the one or more fingerprints, the program instructions are executable by the at least one processor to check the cache for hits on the one or more fingerprints via an interface to the cache service.

6. The system as recited in claim 1, wherein the cache is an in-memory cache.

7. The system as recited in claim 1, wherein the data store is on a provider network that provides the data store as remote data storage to one or more clients, wherein the system is on the storage provider network, and wherein the device is on a client network.

8. The system as recited in claim 7, wherein the device implements a storage gateway process that provides an interface between one or more client processes on the client network and a respective client's data stored on the data store.

9. A method, comprising:
performing, by one or more computing devices:
storing fingerprints of deduplication data blocks stored in a data store and indexes indicating locations of respective deduplication data blocks in the data store as key/value pairs in a cache, wherein the data store stores data for one or more clients in chunks, each chunk comprising a plurality of data blocks;
checking a cache for hits on fingerprints received from the one or more clients;
obtaining data blocks from the one or more clients for fingerprints that are not in the cache;
retrieving deduplication data blocks from the data store for fingerprints that are in the cache according to respective indexes in the cache; and
uploading new chunks to the data store, at least one new chunk comprising data blocks obtained from a client and deduplication data blocks retrieved from the data store.

10. The method as recited in claim 9, further comprising updating the cache for each new chunk, wherein updating the cache for a new chunk comprises:
generating a fingerprint and an index for each data block in the new chunk; and
writing the generated fingerprints and indexes as key/value pairs to the cache.

11. The method as recited in claim 10, wherein the method further comprises storing cache update requests for new chunks to a queue, and wherein a background process performs said updating according to the cache update requests in the queue.

12. The method as recited in claim 11, further comprising discarding a cache update request for a new chunk upon determining that the queue is full.

13. The method as recited in claim 9, further comprising, for at least one fingerprint that is in the cache, determining that a chunk indicated by the respective index is not present in the data store and, in response to said determining, deleting the respective key/value pair from the cache.

14. The method as recited in claim 9, wherein each index in the cache includes information identifying a respective chunk in the data store and information identifying a respective data block in the respective chunk.

15. The method as recited in claim 14, wherein the chunks in the data store are versioned, and wherein each index further includes information identifying a version of the respective chunk.

16. The method as recited in claim 9, wherein the cache is a two-stage cache that includes the fingerprints and indexes in key/value pairs as first-level cache entries and that also includes second-level cache entries that identify chunks in the data store, wherein each index in the first-level cache entries includes information mapping a deduplication data block corresponding to the fingerprint indicated by the key to a location in a chunk and information indicating one of the second-level cache entries that identifies the respective chunk in the data store.

17. The method as recited in claim 16, further comprising updating the cache for each new chunk, wherein updating the cache for a new chunk comprises updating one of the second-level cache entries that identifies a chunk being replaced by the new chunk with information that identifies the new chunk.

18. The method as recited in claim 9, wherein each fingerprint is a hash of a respective data block.

19. The method as recited in claim 9, further comprising constructing a new chunk prior to uploading the new chunk to the data store, wherein constructing the new chunks comprises:
retrieving a copy of a chunk indicated by at least one cache hit from the data store;
extracting at least one deduplication data block indicated by the at least one cache hit from the copy of the chunk; and
storing one or more new data blocks obtained from a client for fingerprints that are not in the cache and the at least one deduplication data block extracted from the copy of the chunk at respective locations in the new chunk.

20. The method as recited in claim 19, further comprising:
retrieving one or more other data blocks from a chunk in the data store that is being updated with the new data blocks obtained from the client; and
storing the one or more other data blocks in the new chunk.

21. The method as recited in claim 9, further comprising:
determining that one or more entries in the cache is stale, wherein a cache entry is determined to be stale if the cache entry has not been hit for a specified period or if there have been less than a threshold number of hits on the cache entry in a specified period; and
deleting the determined one or more stale cache entries from the cache.

22. A non-transitory computer-accessible storage medium storing program instructions computer-executable to implement a deduplication process operable to:
store hashes of deduplication data blocks and indexes indicating locations of respective deduplication data blocks in a data store as key/value pairs in a cache, wherein the data store stores data for one or more clients in chunks, each chunk comprising a plurality of data blocks;
receive data upload requests from each of the one or more clients; and for at least one of the data upload requests:
  obtain one or more new data blocks from a respective client;
  retrieve one or more deduplication data blocks as indicated by the cache from the data store;
  build a new chunk comprising the one or more new data blocks and the one or more deduplication data blocks; and
  update the cache to include a key/value pair corresponding to each data block in the new chunk.

23. The non-transitory computer-accessible storage medium as recited in claim 22, wherein the deduplication process is further operable to store the new chunk comprising the one or more new data blocks and the one or more deduplication data blocks to the data store.

24. The non-transitory computer-accessible storage medium as recited in claim 22, wherein the deduplication process is further operable to retrieve one or more other data blocks from a chunk in the data store that is being updated with the one or more new data blocks obtained from the respective client, wherein the new chunk further comprises the one or more other data blocks.

25. The non-transitory computer-accessible storage medium as recited in claim 22, wherein each data upload request includes one or more hashes for data blocks at the respective client, wherein, for each data upload request, the deduplication process is further operable to check the cache for hits on the respective one or more hashes.

26. The non-transitory computer-accessible storage medium as recited in claim 25, wherein the deduplication process is further operable to, for each of one or more data upload requests for which there are no hits in the cache:
  obtain a new data block from a respective client for each of the one or more hashes included in the respective data upload request;
  build a new chunk comprising the one or more new data blocks; and
  update the cache to include a key/value pair corresponding to each data block in the new chunk.

27. The non-transitory computer-accessible storage medium as recited in claim 22, wherein the deduplication process is further operable to, for at least one other of the data upload requests:
  obtain data blocks from a respective client;
  build a new chunk comprising the data blocks;
  upload the new chunk comprising the data blocks to the data store; and
  update the cache to include a key/value pair corresponding to each data block in the new chunk.

28. The non-transitory computer-accessible storage medium as recited in claim 22, wherein the deduplication process is further operable to delete cache entries for deduplication data blocks in chunks that are not present in the data store.

29. The non-transitory computer-accessible storage medium as recited in claim 22, wherein each data upload request includes hashes for at least a threshold number of data blocks in a chunk at the respective client, and wherein, for each data upload request, the deduplication process is further operable to check the cache for hits on each of the respective hashes.

* * * * *